United States Patent
Ryu

(10) Patent No.: US 9,042,038 B2
(45) Date of Patent: May 26, 2015

(54) TELEPHOTO LENS SYSTEM AND ELECTRONIC APPARATUS HAVING THE SAME

(71) Applicant: SAMSUNG ELECTRONICS CO., LTD., Suwon-si, Gyeonggi-do (KR)

(72) Inventor: Jae-myung Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/132,424

(22) Filed: Dec. 18, 2013

(65) Prior Publication Data

US 2014/0300804 A1 Oct. 9, 2014

(30) Foreign Application Priority Data

Apr. 8, 2013 (KR) .................. 10-2013-0038286

(51) Int. Cl.
 *G02B 13/02* (2006.01)
 *G02B 27/64* (2006.01)

(52) U.S. Cl.
 CPC .............. *G02B 13/02* (2013.01); *G02B 27/646* (2013.01)

(58) Field of Classification Search
 USPC .................................... 359/745, 748
 See application file for complete search history.

(56) References Cited

U.S. PATENT DOCUMENTS 5,745,306 A 4/1998 Sato
6,115,188 A 9/2000 Nishio et al.

FOREIGN PATENT DOCUMENTS

| JP | 08-327897 A | 12/1996 |
| JP | 11-119092 A | 4/1999 |
| JP | 11-160617 A | 6/1999 |
| JP | 2000-089101 A | 3/2000 |
| JP | 2008-145584 A | 6/2008 |
| JP | 2011-197413 A | 10/2011 |

*Primary Examiner* — Jack Dinh
(74) *Attorney, Agent, or Firm* — Drinker Biddle & Reath LLP

(57) ABSTRACT

A telephoto lens system and an electronic apparatus having the same are provided. The telephoto lens system includes a first lens group having a positive refractive power, a second lens group having a negative refractive power, and a third lens group. The third lens group includes a (3-1)-th lens group having a positive refractive power, a (3-2)-th lens group having a negative refractive power, and a (3-3)-th lens group having a positive refractive power.

25 Claims, 17 Drawing Sheets

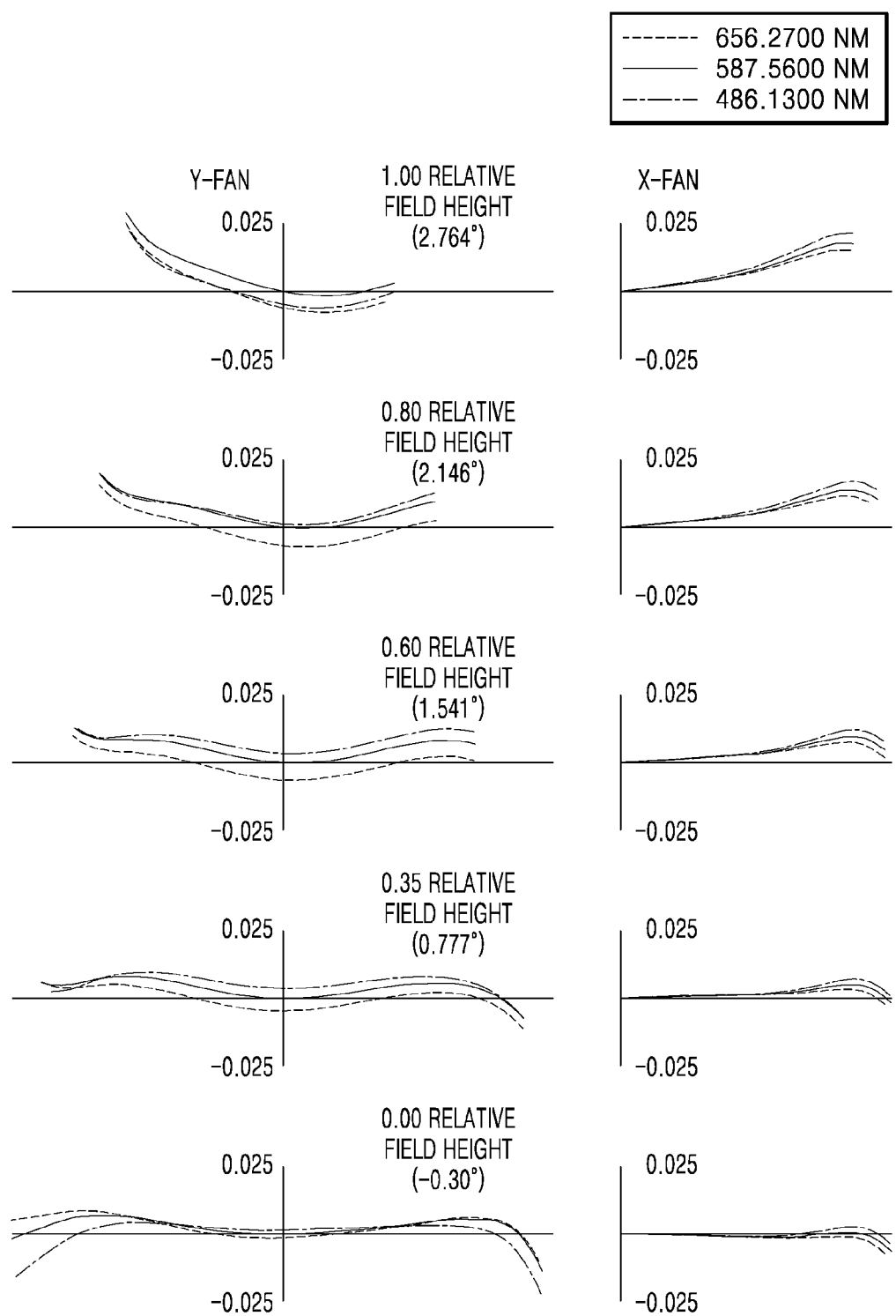

TELEPHOTO LENS SYSTEM AND ELECTRONIC APPARATUS HAVING THE SAME

CROSS-REFERENCE TO RELATED PATENT APPLICATIONS

This application claims the priority benefit of Korean Patent Application No. 10-2013-0038286, filed on Apr. 8, 2013, in the Korean Intellectual Property Office, the disclosure of which is incorporated herein in their entirety by reference.

BACKGROUND

1. Field

One or more embodiments of the invention relate to a telephoto lens system that may be miniaturized and may be easily processed, and an electronic apparatus having the same.

2. Description of the Related Art

Presently, miniaturization and power saving functions of photographing apparatuses are required, and miniaturization of photographing apparatuses using a solid-state imaging device, such as a charge-coupled device (CCD) type image sensor or a complementary metal-oxide semiconductor (CMOS) type image sensor, is required. Examples of photographing apparatuses include a digital still camera, a video camera, an exchangeable lens camera, and the like. Also, photographing apparatuses using a solid-state imaging device are suitable for miniaturization and thus have been applied to a small-sized information terminal such as a mobile phone. Users have desires for photographing apparatuses having high performance, low power consumption, and a wide viewing angle. Also, the consumers' knowledge of cameras is continuously increasing, and thus the demand for a single focus lens systems, such as a wide angle lens system or a telephoto lens system, is also increasing.

However, since the number of lenses in a telephoto lens system typically increases to improve performance, it is thus difficult to achieve miniaturization. Also, it is more difficult to perform lens processing for correcting spherical aberration or astigmatic field curvature.

SUMMARY

One or more embodiments of the invention include a telephoto lens system that may be miniaturized and may be easily processed.

One or more embodiments include an electronic apparatus having a telephoto lens system that may be miniaturized and may be easily processed.

Additional aspects will be set forth in part in the description which follows and, in part, will become apparent from the description, or may be learned by practice of the presented embodiments.

According to one or more embodiments, a telephoto lens system includes a first lens group having a positive refractive power, a second lens group having a negative refractive power, and a third lens group. The third lens group includes a (3-1)-th lens group having a positive refractive power, a (3-2)-th lens group having a negative refractive power, and a (3-3)-th lens group having a positive refractive power. All lenses included in the first lens group satisfy the following equation 1, and the third lens group satisfies the following equation 2:

$$\frac{1}{4} \cdot \left\| \frac{D_1}{R_1} \right| - \left| \frac{D_2}{R_2} \right| \right\| \geq 0.06, \quad (1)$$

$$6 \leq \left| f_3 \cdot \left( \frac{1}{f_{3-1}} + \frac{1}{f_{3-2}} + \frac{1}{f_{3-3}} \right) \right|, \quad (2)$$

for each lens included in the first lens group, $D_1$ is an effective diameter of a lens surface directed toward an object side, $R_1$ is a radius of curvature of the lens surface directed toward the object side, $D_2$ is an effective diameter of a lens surface directed toward an image side, and $R_2$ is a radius of curvature of the lens surface directed toward the image side. In equation 2, $f_3$ is a focal length of the third lens group, $f_{3-1}$ is a focal length of the (3-1)-th lens group, $f_{3-2}$ is a focal length of the (3-2)-th lens group, and $f_{3-3}$ is a focal length of the (3-3)-th lens group.

According to one or more embodiments, a telephoto lens system includes a first lens group having a positive refractive power, a second lens group having a negative refractive power, and a third lens group. The third lens group includes a (3-1)-th lens group having a positive refractive power, a (3-2)-th lens group having a negative refractive power, and a (3-3)-th lens group having a positive refractive power. All lenses included in the first lens group satisfy the following equation 3, and the first lens group and the second lens group satisfy the following equation 4:

$$\frac{1}{4} \cdot \left\| \frac{D_1}{R_1} \right| - \left| \frac{D_2}{R_2} \right| \right\| \geq 0.06, \quad (3)$$

$$0.7 \leq \frac{f_{12}}{f} \leq 1.2, \quad (4)$$

for each lens included in the first lens group, $D_1$ is an effective diameter of a lens surface directed toward an object side, $R_1$ is a radius of curvature of the lens surface directed toward the object side, $D_2$ is an effective diameter of a lens surface directed toward an image side, and $R_2$ is a radius of curvature of the lens surface directed toward the image side. In equation 4, $f_3$ is a focal length of the third lens group, $f_{3-1}$ is a focal length of the (3-1)-th lens group, $f_{3-2}$ is a focal length of the (3-2)-th lens group, and $f_{3-3}$ is a focal length of the (3-3)-th lens group.

According to one or more embodiments, a telephoto lens system includes a first lens group having a positive refractive power, a second lens group having a negative refractive power, and a third lens group. The third lens group includes a (3-1)-th lens group having a positive refractive power, a (3-2)-th lens group having a negative refractive power, and a (3-3)-th lens group having a positive refractive power. The telephoto lens system satisfies the following equation:

$$0.7 \leq \frac{f_{12}}{f} \leq 0.95,$$

where $f_{12}$ is an effective focal length of the first lens group and the second lens group from infinity, and f is the entire focal length of the telephoto lens system from infinity.

The second lens group may perform focusing.

The (3-2)-th lens group may include at least one bi-concave lens.

The (3-2)-th lens group may include two or three lenses.

The (3-2)-th lens group may perform hand shake correction.

The telephoto lens system may satisfy the following equation:

$$-2.5 \leq f \cdot \left(\frac{1}{f_1} + \frac{1}{f_2} + \frac{1}{f_{3-1}} + \frac{1}{f_{3-2}} + \frac{1}{f_{3-3}}\right) \leq 2.5,$$

where $f_1$ is a focal length of the first lens group, $f_2$ is a focal length of the second lens group, $f_{3-1}$ is the focal length of the (3-1)-th lens group, $f_{3-2}$ is the focal length of the (3-2)-th lens group, and $f_{3-3}$ is the focal length of the (3-3)-th lens group.

The telephoto lens system may satisfy the following equation:

$$-5 \leq f \cdot \left(\frac{n_1}{f_1} + \frac{n_2}{f_2} + \frac{n_{3-1}}{f_{3-1}} + \frac{n_{3-2}}{f_{3-2}} + \frac{n_{3-3}}{f_{3-3}}\right) \leq 5,$$

where $n_1$ is an average refractive index of the first lens group, $n_2$ is an average refractive index of the second lens group, $n_{3-1}$ is an average refractive index of the (3-1)-th lens group, $n_{3-2}$ is an average refractive index of the (3-2)-th lens group, $n_{3-3}$ is an average refractive index of the (3-3)-th lens group, $f_1$ is a focal length of the first lens group, $f_2$ is a focal length of the second lens group, $f_{3-1}$ is the focal length of the (3-1)-th lens group, $f_{3-2}$ is the focal length of the (3-2)-th lens group, and $f_{3-3}$ is the focal length of the (3-3)-th lens group.

The third lens group may include an aperture stop.

The second lens group may include two or less lenses.

The second lens group may include at least one concave lens.

The (3-2)-th lens group may include at least one doublet lens.

The second lens group may move toward the image side when focusing is performed.

The first lens group may include a lens having an Abbe number of less than 75, where the lens is the closest to the object side from among all the lenses of the first lens group.

According to one or more embodiments, an electronic apparatus includes a telephoto lens system, and an imaging device that receives light formed by the telephoto lens system. The telephoto lens system includes a first lens group having a positive refractive power, a second lens group having a negative refractive power, and a third lens group. The third lens group includes a (3-1)-th lens group having a positive refractive power, a (3-2)-th lens group having a negative refractive power, and a (3-3)-th lens group having a positive refractive power. All lenses included in the first lens group satisfy the following equation 1, and the third lens group satisfies the following equation 2:

$$\frac{1}{4} \cdot \left\| \frac{D_1}{R_1} \right| - \left| \frac{D_2}{R_2} \right| \right\| \geq 0.06, \quad (1)$$

$$6 \leq \left| f_3 \cdot \left(\frac{1}{f_{3-1}} + \frac{1}{f_{3-2}} + \frac{1}{f_{3-3}}\right) \right|, \quad (2)$$

for each lens included in the first lens group, $D_1$ is an effective diameter of a lens surface directed toward an object side, $R_1$ is a radius of curvature of the lens surface directed toward the object side, $D_2$ is an effective diameter of a lens surface directed toward an image side, and $R_2$ is a radius of curvature of the lens surface directed toward the image side. In equation 2, $f_3$ is a focal length of the third lens group, $f_{3-1}$ is a focal length of the (3-1)-th lens group, $f_{3-2}$ is a focal length of the (3-2)-th lens group, and $f_{3-3}$ is a focal length of the (3-3)-th lens group.

BRIEF DESCRIPTION OF THE DRAWINGS

These and/or other aspects will become apparent and more readily appreciated from the following description of the embodiments, taken in conjunction with the accompanying drawings of which:

FIG. 4A is a lateral aberration diagram of the telephoto lens system of FIG. 3 when a hand shake correction group of the telephoto lens system is moved downward in a direction perpendicular to an optical axis by 1.3 mm;

DETAILED DESCRIPTION

Figure 1:
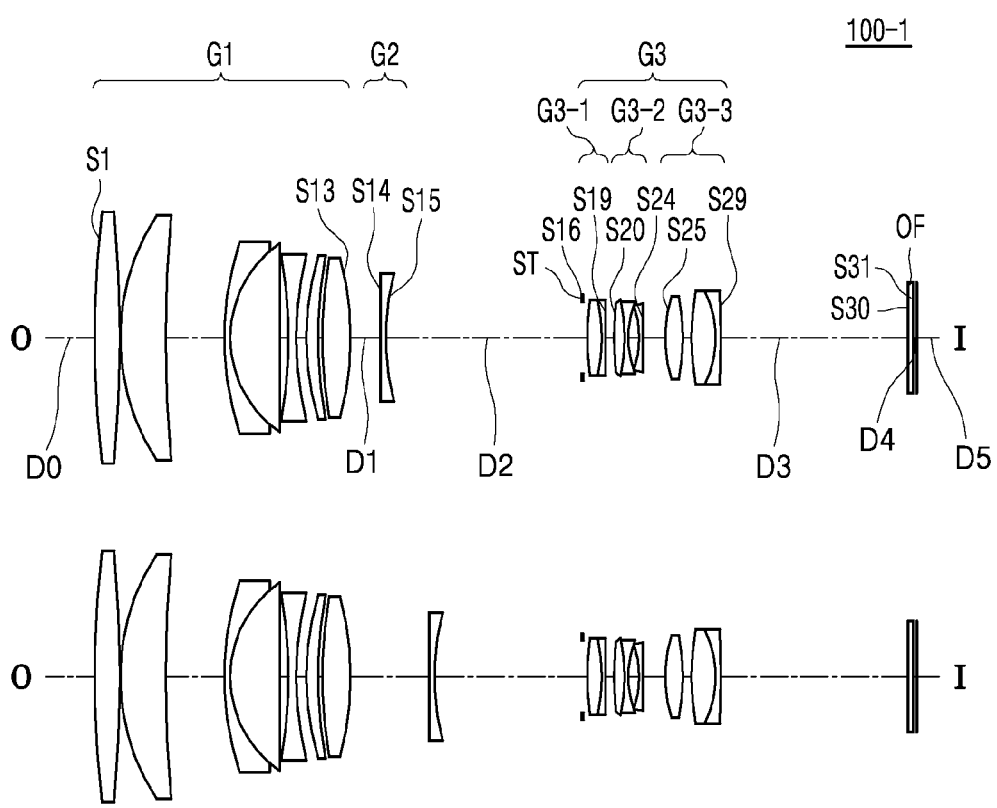
FIG. 1 illustrates a telephoto lens system, according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

FIG. 1 illustrates a telephoto lens system 100-1, according to an embodiment. The telephoto lens system 100-1 includes a first lens group G1 having a positive refractive power, a second lens group G2 having a negative refractive power, and a third lens group G3 having a positive or negative refractive power, which are sequentially arranged from an object side O to an image side I. The third lens group G3 may include a (3-1)-th lens group G3-1 having a positive refractive power, a (3-2)-th lens group G3-2 having a negative refractive power, and a (3-3)-th lens group G3-3 having a positive refractive power.

The second lens group G2 may perform focusing. The second lens group G2 may move to the image side I when performing focusing from infinity to a near object distance. When focusing is performed by the second lens group G2, the locations of first lens group G1 and the third lens group G3 may be fixed. In this way, the telephoto lens system 100-1 may adopt an inner focusing method, whereby focusing is performed by a lens group that is not a front lens group inside a lens system. The second lens group G2 may include two or less lenses. The second lens group G2 is configured to have a relatively small number of lenses such that the second lens group G2 can perform fast focusing. For example, the second lens group G2 may include at least one concave lens. The concave lens may be a bi-concave lens or a one-side concave lens.

The third lens group G3 may include a hand shake correction group. For example, the (3-2)-th lens group G3-2 may perform hand shake correction. The (3-2)-th lens group G3-2 may include two or three lenses. For example, the (3-2)-th lens group G3-2 may include at least one bi-concave lens. The (3-2)-th lens group G3-2 having a negative refractive power performs hand shake correction, and the (3-1)-th lens group G3-1 that is disposed at the object side O of the (3-2)-th lens group G3-2 and the (3-3)-th lens group G3-3 that is disposed at the image side I of the (3-2)-th lens group G3-2 have a positive refractive power. When the (3-1)-th lens group G3-1 has a positive refractive power, light rays are converged onto the (3-2)-th lens group G3-2. Thus, the size of the (3-2)-th lens group G3-2 (the hand shake correction group) may be reduced so that the hand shake correction group is lightweight.

In addition, the (3-2)-th lens group G3-2 may include at least one doublet lens. The third lens group G3 may include an aperture stop ST. For example, the aperture stop ST may be disposed at the object side O of a lens of the third lens group G3 that is closest to the object side O.

For example, the (3-2)-th lens group G3-2 according to a first embodiment (FIG. 1) includes a doublet lens having a first bi-convex lens and a second bi-concave lens, and a third bi-concave lens. A (3-2)-th lens group G3-2 according to a second embodiment (FIG. 3) includes a doublet lens having a bi-concave lens. A (3-2)-th lens group G3-2 according to a third embodiment (FIG. 5) includes a meniscus lens having a positive refractive power and a doublet lens having a bi-concave lens. A (3-2)-th lens group G3-2 according to a fourth embodiment (FIG. 7) includes a doublet lens having a fourth bi-convex lens and a fifth bi-concave lens, and a sixth bi-concave lens.

The telephoto lens system 100-1 is configured in such a way that all lenses included in the first lens group G1 may satisfy the following Equation 1, thus easily processing a lens:

$$\frac{1}{4} \cdot \left\| \frac{D_1}{R_1} \right| - \left| \frac{D_2}{R_2} \right| \right\| \geq 0.06 \quad (1)$$

For each of the lenses included in the first lens group G1, $D_1$ is an effective diameter of a lens surface directed toward an object side O, $R_1$ is a radius of curvature of the lens surface directed toward the object side O, $D_2$ is an effective diameter of a lens surface directed toward the image side I, and $R_2$ is a radius of curvature of the lens surface directed toward the image side I.

Equation 1 defines a depth value (z-value). If the depth value (z-value) is 0, a lens is a planar lens, and if the depth value (z-value) is 1, a lens is a hemispherical lens. As the depth value (z-value) decreases, it is more difficult to process the lens. All lenses included in the first lens group G1 satisfy the above Equation 1 so that lens processing can be easily performed. In general, as a focal length in a telephoto lens system increases, a lens formed of a low dispersive material having a small change of refractive index according to a wavelength is more often used, and a lens that is closest to the object side O of the first lens group G1 is usually formed of a low dispersive material. However, the low dispersive material has a weak environmental resistance. Thus, when the low dispersive material is used for the lens that is closest to the object side O of the first lens group G1, a meniscus-shaped protection glass having a very small depth value (z-value) and a very large radius of curvature is usually used in addition to the lens that is closest to the object side O in the first lens group G1 so as to compensate for this vulnerability. This protection glass is not easily processed and does not contribute to aberration correction. However, in the present embodiment, all lenses included in the first lens group G1 satisfy the above Equation 1 so that lens processing can be easily performed and no additional optical member, such as protection glass, is required. Thus, manufacturing cost can be reduced.

For example, the lens that is a second lens that is closest to the object side O in the first lens group G1 has an Abbe number of less than 75 and a z-value of more than 0.06 so that the environmental resistance can be improved. In addition, a lens that is close to the object side O in the first lens group G1 is formed of a low dispersive material and has a small refractive power to increase a curvature of the lens so that the thickness of an edge part of the lens can be easily obtained.

A focal length of the third lens group G3 including the hand shake correction group is formed relatively long so that a change of optical performance, which is caused by a change of a distance between the second lens group G2 and the third lens group G3, can be reduced. The third lens group G3 may satisfy the following Equation 2:

$$6 \leq \left| f_3 \cdot \left( \frac{1}{f_{3-1}} + \frac{1}{f_{3-2}} + \frac{1}{f_{3-3}} \right) \right| \quad (2)$$

where $f_3$ is the entire focal length of the third lens group G3, $f_{3-1}$ is a focal length of the (3-1)-th lens group G3-1, $f_{3-2}$ is a focal length of the (3-2)-th lens group G3-2, and $f_{3-3}$ is a focal length of the (3-3)-th lens group G3-3.

Equation 2 is established by multiplying a Petzval sum of the third lens group G3 by the focal length of the third lens group G3 and is proportional to the focal length of the third lens group G3. The Petzval sum is defined by the sum of multiples of refractive indices and refractive powers of lenses, and an inverse of the Petzval sum reflects a radius of curvature of an image plane. The radius of curvature of the image plane refers to the formation of a curvature plane from a focal plane depending on an image height of an image plane and astigmatic field curvature, where a focal position of the astigmatic field curvature varies according to a viewing angle. If the Petzval sum is 0, the image plane is a flat plane, which means that astigmatic field curvature is completely corrected. When the third lens group G3 satisfies the above Equation 2, the third lens group G3 may be a focal so that its effective focal length is very long. If the third lens group G3 is a focal, sensitivity caused by the change of the distance between the second lens group G2 and the third lens group G3 is lowered, thus allowing the telephoto lens system to be easily manufactured. In addition, a change of performance in the telephoto lens system caused by the distance between the second lens group G2 and the third lens group G3 may be reduced. Also, a change of performance caused by movement of a focusing lens group is determined by sensitivity to the distance between the second lens group G2 and the third lens group G3, and the change of performance may result in astigmatic field curvature of the telephoto lens caused by movement of the focusing lens group. When the third lens group G3 satisfies the above Equation 2, the Petzval sum is reduced, and even when the third lens group G3 is configured to be a focal, the change of performance of the telephoto lens system caused by movement of the focusing lens group may be reduced.

Next, the telephoto lens system 100-1 according to the present embodiment may satisfy the following Equation 3:

$$0.7 \leq \frac{f_{12}}{f} \leq 1.2 \quad (3)$$

where $f_{12}$ is an effective focal length of the first lens group G1 and the second lens group G2 from infinity, and f is the entire focal length of the telephoto lens system 100-1 from infinity.

Equation 3 represents a ratio of the effective focal length of the first lens group G1 and the second lens group G2 with respect to the entire focal length of the telephoto lens system 100-1. If ($f_{12}$/f) satisfies the above Equation 3, magnification of the second lens group G2 increases. Thus, a change (position change) quantity of the image plane caused by longitudinal movement of the second lens group G2 increases so that a shortest photographing distance can be easily obtained.

For example, the telephoto lens system 100-1 may satisfy the following Equation 4:

$$0.7 \leq \frac{f_{12}}{f} \leq 0.95 \quad (4)$$

When ($f_{12}$/f) satisfies the above Equation 4, the focal length of the second lens group G2 may increase and simultaneously, magnification thereof may increase. If a difference between the focal length of the first lens group G1 and the focal length of the second lens group G2 is not large, the refractive power of the telephoto lens system 100-1 may be appropriately adjusted so that sensitivity of manufacturing the telephoto lens system 100-1 can be reduced.

The telephoto lens system 100-1 may satisfy the following Equations 5 and 6:

$$-2.5 \leq f \cdot \left( \frac{1}{f_1} + \frac{1}{f_2} + \frac{1}{f_{3\text{-}1}} + \frac{1}{f_{3\text{-}2}} + \frac{1}{f_{3\text{-}3}} \right) \leq 2.5 \quad (5)$$

where $f_1$ is a focal length of the first lens group G1, $f_2$ is a focal length of the second lens group G2, $f_{3\text{-}1}$ is a focal length of the (3-1)-th lens group G3-1, $f_{3\text{-}2}$ is a focal length of the (3-2)-th lens group G3-2, and $f_{3\text{-}3}$ is a focal length of the (3-3)-th lens group G3-3.

$$-5 \leq f \cdot \left( \frac{n_1}{f_1} + \frac{n_2}{f_2} + \frac{n_{3\text{-}1}}{f_{3\text{-}1}} + \frac{n_{3\text{-}2}}{f_{3\text{-}2}} + \frac{n_{3\text{-}3}}{f_{3\text{-}3}} \right) \leq 5 \quad (6)$$

where $n_1$ is an average refractive index of the first lens group G1, $n_2$ is an average refractive index of the second lens group G2, $n_{3\text{-}1}$ is an average refractive index of the (3-1)-th lens group G3-1, $n_{3\text{-}2}$ is an average refractive index of the (3-2)-th lens group G3-2, $n_{3\text{-}3}$ is an average refractive index of the (3-3)-th lens group G3-3, $f_1$ is the entire focal length of the first lens group G1, $f_2$ is the entire focal length of the second lens group G2, $f_{3\text{-}1}$ is a focal length of the (3-1)-th lens group G3-1, $f_{3\text{-}2}$ is a focal length of the (3-2)-th lens group G3-2, and $f_{3\text{-}3}$ is a focal length of the (3-3)-th lens group G3-3.

Equations 5 and 6 represent the Petzval sum of the entire telephoto lens system 100-1, and when Equations 5 and 6 are satisfied, astigmatic field curvature may be corrected.

Hereinafter, design data of a telephoto lens system according to exemplary embodiments will be described. Hereinafter, f is the entire focal length in units of mm, Fno is an F number, 2ω is a viewing angle in units of degree, R is a radius of curvature, Dn is a distance between lenses or a lens thickness, Nd is a refractive index, vd is an Abbe number, ST is an aperture stop, obj is an object plane, and img is an image plane (or photographing plane), respectively. In the drawings in which the exemplary embodiments are shown, at least one filter OF may be provided at a point that is closest to the image side I.

First Embodiment

FIG. 1 illustrates a telephoto lens system 100-1 in relation to infinity and a near object distance according to a first embodiment. The following Table 1 shows design data of the first embodiment. Lens surface numbers are partially shown in FIG. 1.

TABLE 1

| Lens surface | R | Dn | Nd | vd | Z-value | Note |
| --- | --- | --- | --- | --- | --- | --- |
| obj | infinity | D0 | | | | |
| S1 | 467.108 | 10.000 | 1.48749 | 70.44 | 0.1053 | First lens group G1 |
| S2 | −467.108 | 0.200 | | | | |
| S3 | 90.944 | 17.000 | 1.49700 | 81.61 | 0.2037 | |
| S4 | 395.623 | 23.311 | | | | |
| S5 | 125.561 | 2.540 | 1.69680 | 55.46 | 0.2199 | |

TABLE 1-continued

| Lens surface | R | Dn | Nd | vd | Z-value | Note |
|---|---|---|---|---|---|---|
| S6 | 45.800 | 19.000 | 1.49700 | 81.61 | 0.3696 | |
| S7 | infinity | 3.500 | | | | |
| S8 | −182.993 | 3.000 | 1.83481 | 42.72 | 0.2109 | |
| S9 | 130.744 | 3.918 | | | | |
| S10 | 120.895 | 5.000 | 1.72825 | 28.32 | 0.0446 | |
| S11 | 180.606 | 1.000 | | | | |
| S12 | 180.606 | 11.000 | 1.49700 | 81.61 | 0.2044 | |
| S13 | −132.794 | D1 | | | | |
| S14 | infinity | 2.400 | 1.48749 | 70.44 | 0.1360 | Second lens group G2 |
| S15 | 88.416 | D2 | | | | |
| S16(ST) | infinity | 2.000 | | | | (3-1)-th lens group G3-1 |
| S17 | 106.016 | 6.000 | 1.70154 | 41.15 | 0.1882 | |
| S18 | −55.840 | 1.500 | 1.76182 | 26.61 | 0.1131 | |
| S19 | −711.300 | 3.306 | | | | |
| S20 | 121.063 | 4.000 | 1.84666 | 23.78 | 0.1548 | (3-2)-th lens group G3-2 |
| S21 | −70.819 | 1.000 | 1.67790 | 55.52 | 0.3040 | |
| S22 | 31.549 | 4.500 | | | | |
| S23 | −53.211 | 1.000 | 1.69680 | 55.46 | 0.1591 | |
| S24 | 185.513 | 9.236 | | | | |
| S25 | 66.705 | 7.000 | 1.58144 | 40.89 | 0.2427 | (3-3)-th lens group G3-3 |
| S26 | −66.705 | 3.504 | | | | |
| S27 | 125.270 | 9.500 | 1.58144 | 40.89 | 0.2814 | |
| S28 | −38.741 | 1.500 | 1.84666 | 23.78 | 0.1936 | |
| S29 | −400.000 | D3 | | | | |
| S30 | infinity | 2.000 | 1.51680 | 64.20 | | |
| S31 | infinity | D4 | | | | |
| img | infinity | D5 | | | | |

The following Table 2 shows a variable length represented by D0-D5, a focal length f, a viewing angle 2ω, and an F number Fno when focusing is performed in the first embodiment.

TABLE 2

| Item | Infinity | Near Object distance |
|---|---|---|
| D0 | infinity | 2480.030375 |
| D1 | 11.750140 | 30.575304 |
| D2 | 76.424019 | 57.598856 |
| D3 | 72.910797 | 72.910797 |
| D4 | 0.976265 | 1.021304 |
| D5 | 0.030332 | −0.013955 |
| F | 391.975776 | 0.160837 |
| 2ω | 3.154 | 2.173 |
| Fno | 4.022 | 4.067 |

Figure 2A:
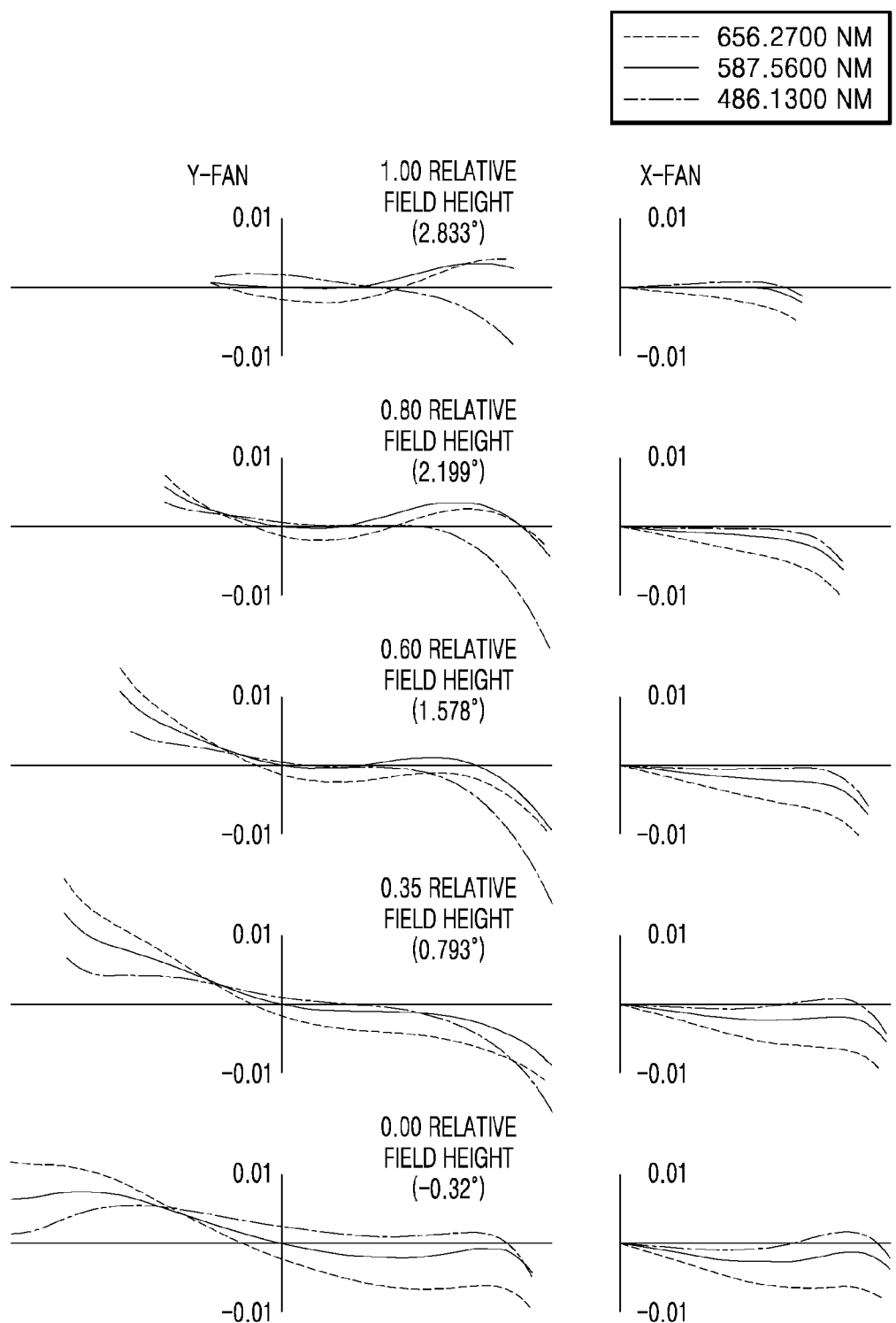
FIG. 2A is a lateral aberration diagram of the telephoto lens system of FIG. 1 when a hand shake correction group of the telephoto lens system is moved downward in a direction perpendicular to an optical axis by 0.9 mm.
Figure 2B:
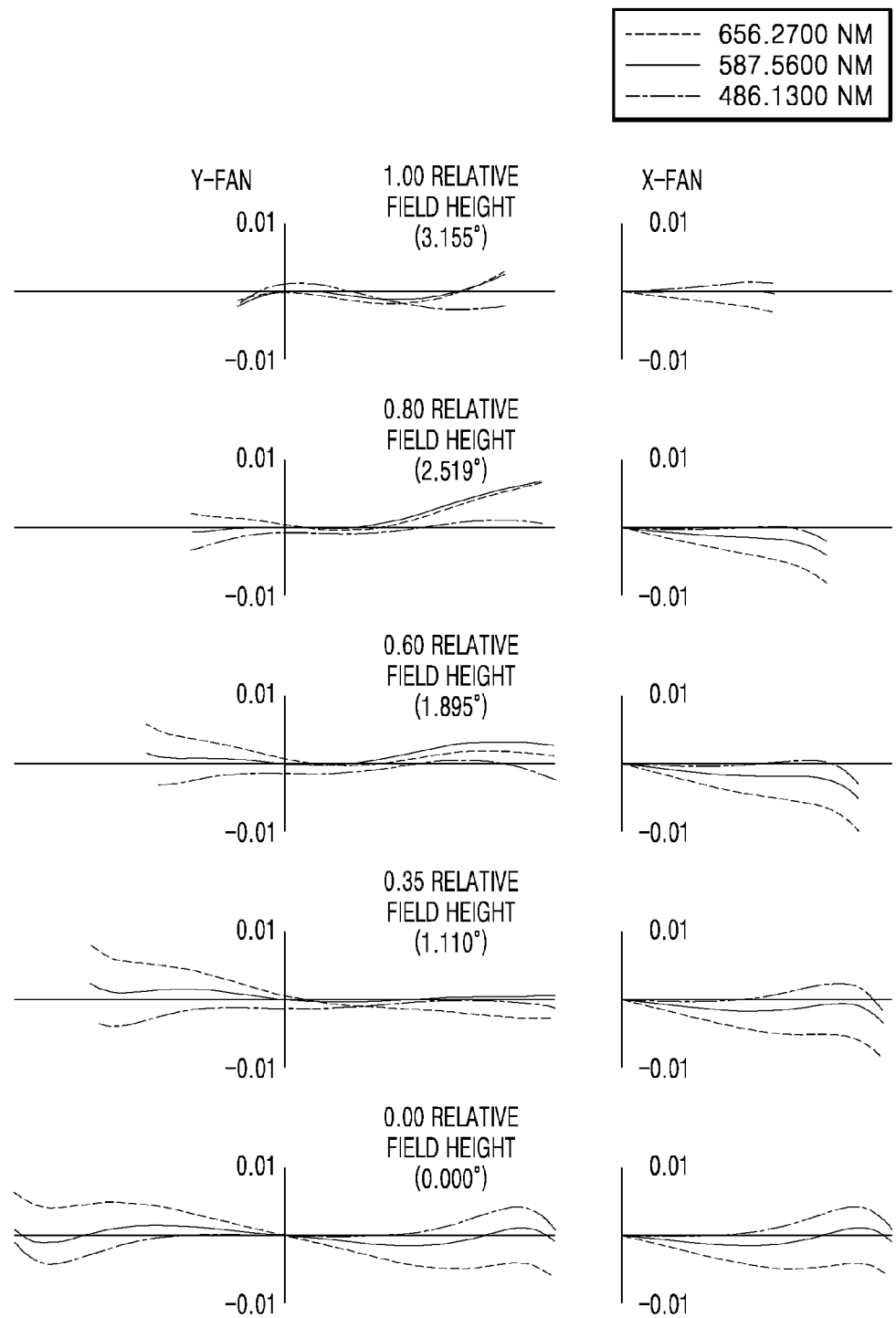
FIG. 2B is a lateral aberration diagram of the telephoto lens system of FIG. 1 when the hand shake correction group of the telephoto lens system is positioned on the optical axis.
Figure 2C:
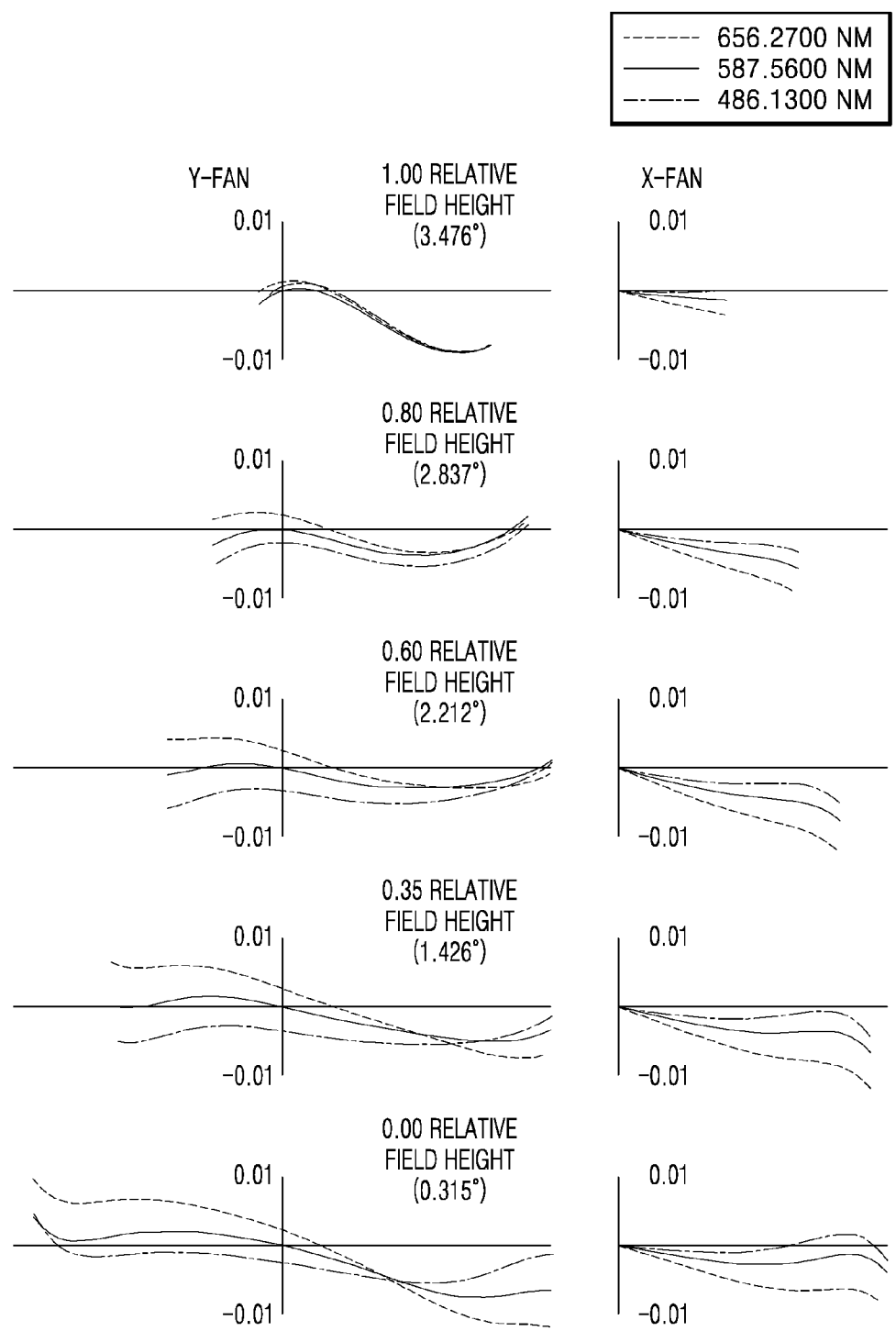
FIG. 2C is a lateral aberration diagram of the telephoto lens system of FIG. 1 when the hand shake correction group of the telephoto lens system is moved upward in a direction perpendicular to the optical axis by 0.9 mm.

FIGS. 2A, 2B, and 2C are lateral aberration diagrams of the telephoto lens system 100-1 when the (3-2)-th lens group G3-2 (the hand shake correction group) of the telephoto lens system 100-1 is moved downward in a direction perpendicular to the optical axis by 0.9 mm, when the (3-2)-th lens group G3-2 (the hand shake correction group) of the telephoto lens system 100-1 is positioned on the optical axis, and when the (3-2)-th lens group G3-2 (the hand shake correction group) of the telephoto lens system 100-1 is moved upward in a direction perpendicular to the optical axis by 0.9 mm, respectively.

Second Embodiment

Figure 3:
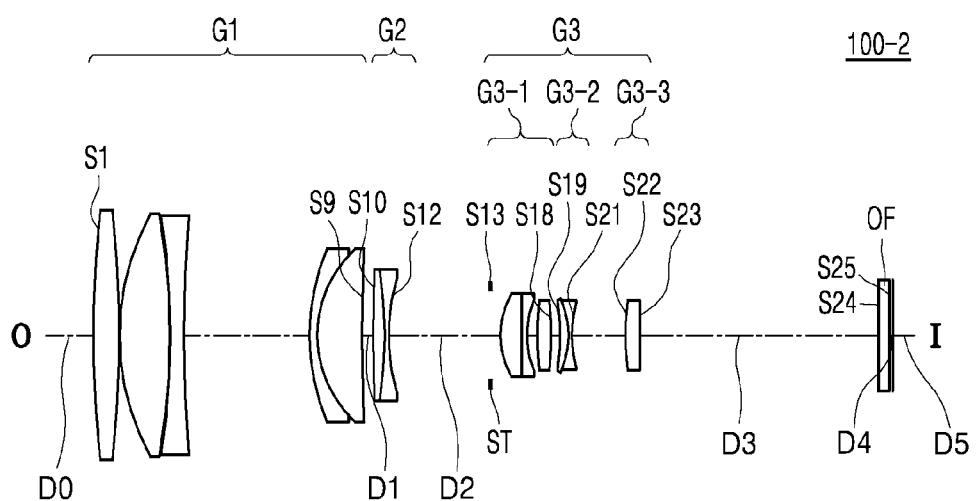
FIG. 3 illustrates a telephoto lens system, according to another embodiment.
Figure 3:
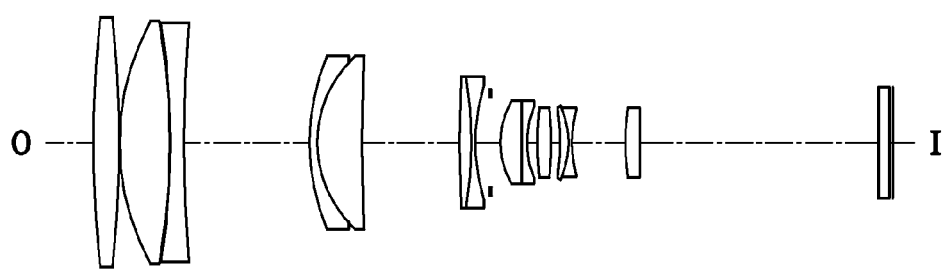

FIG. 3 illustrates a telephoto lens system 100-2 in relation to infinity and a near object distance according to a second embodiment, and the following Table 3 shows design data of the second embodiment.

TABLE 3

| Lens surface | R | Dn | Nd | vd | Z-value | Note |
|---|---|---|---|---|---|---|
| obj | infinity | D0 | | | | |
| S1 | 448.071 | 10.000 | 1.48749 | 70.44 | 0.1086 | First lens group G1 |
| S2 | −448.071 | 0.100 | | | | |
| S3 | 101.447 | 19.300 | 1.49700 | 81.61 | 0.3149 | |
| S4 | −292.790 | 0.143 | | | | |
| S5 | −320.628 | 5.300 | 1.77250 | 49.62 | 0.1143 | |
| S6 | 541.760 | 49.323 | | | | |
| S7 | 92.091 | 2.500 | 1.69680 | 55.46 | 0.1584 | |
| S8 | 45.748 | 17.300 | 1.49700 | 81.61 | 0.3124 | |
| S9 | 529.597 | D1 | | | | |
| S10 | 443.518 | 4.530 | 1.84666 | 23.78 | 0.1061 | Second lens group G2 |
| S11 | −152.131 | 1.500 | 1.83481 | 42.72 | 0.2114 | (AF group) |
| S12 | 85.162 | D2 | | | | |
| S13(ST) | infinity | 3.850 | | | | (3-1)-th lens group G3-1 |
| S14 | 34.823 | 8.000 | 1.56883 | 56.04 | 0.2153 | |
| S15 | 448.071 | 2.000 | 1.84666 | 23.78 | 0.1780 | |
| S16 | 35.837 | 4.240 | | | | |
| S17 | 138.726 | 5.300 | 1.51680 | 64.20 | 0.0983 | |
| S18 | −138.726 | 3.018 | | | | |
| S19 | −126.198 | 3.810 | 1.84666 | 23.78 | 0.1520 | (3-2)-th lens group G3-2 |
| S20 | −32.485 | 1.000 | 1.74950 | 35.04 | 0.3153 | |

TABLE 3-continued

| Lens surface | R | Dn | Nd | vd | Z-value | Note |
|---|---|---|---|---|---|---|
| S21 | 59.130 | 20.759 | | | | |
| S22 | 87.561 | 6.000 | 1.84666 | 23.78 | 0.0840 | (3-3)-th lens group G3-3 |
| S23 | −1000.000 | D3 | | | | |
| S24 | infinity | 4.000 | 1.51680 | 64.20 | | |
| S25 | infinity | D4 | | | | |
| img | infinity | D5 | | | | |

The following Table 4 shows a variable length represented by D0-D5, a focal length f, a viewing angle 2w, and an F number Fno when focusing is performed in the second embodiment.

TABLE 4

| Item | Infinity | Near Object distance |
|---|---|---|
| D0 | infinity | 990.209647 |
| D1 | 4.502738 | 37.982065 |
| D2 | 39.626478 | 6.147150 |
| D3 | 92.697846 | 92.697846 |
| D4 | 0.995780 | 1.279191 |
| D5 | 0.009693 | −0.275818 |
| f | 391.997165 | 0.400940 |
| 2w | 3.163 | 1.968 |
| Fno | 4.063 | 4.107 |

Figure 4B:
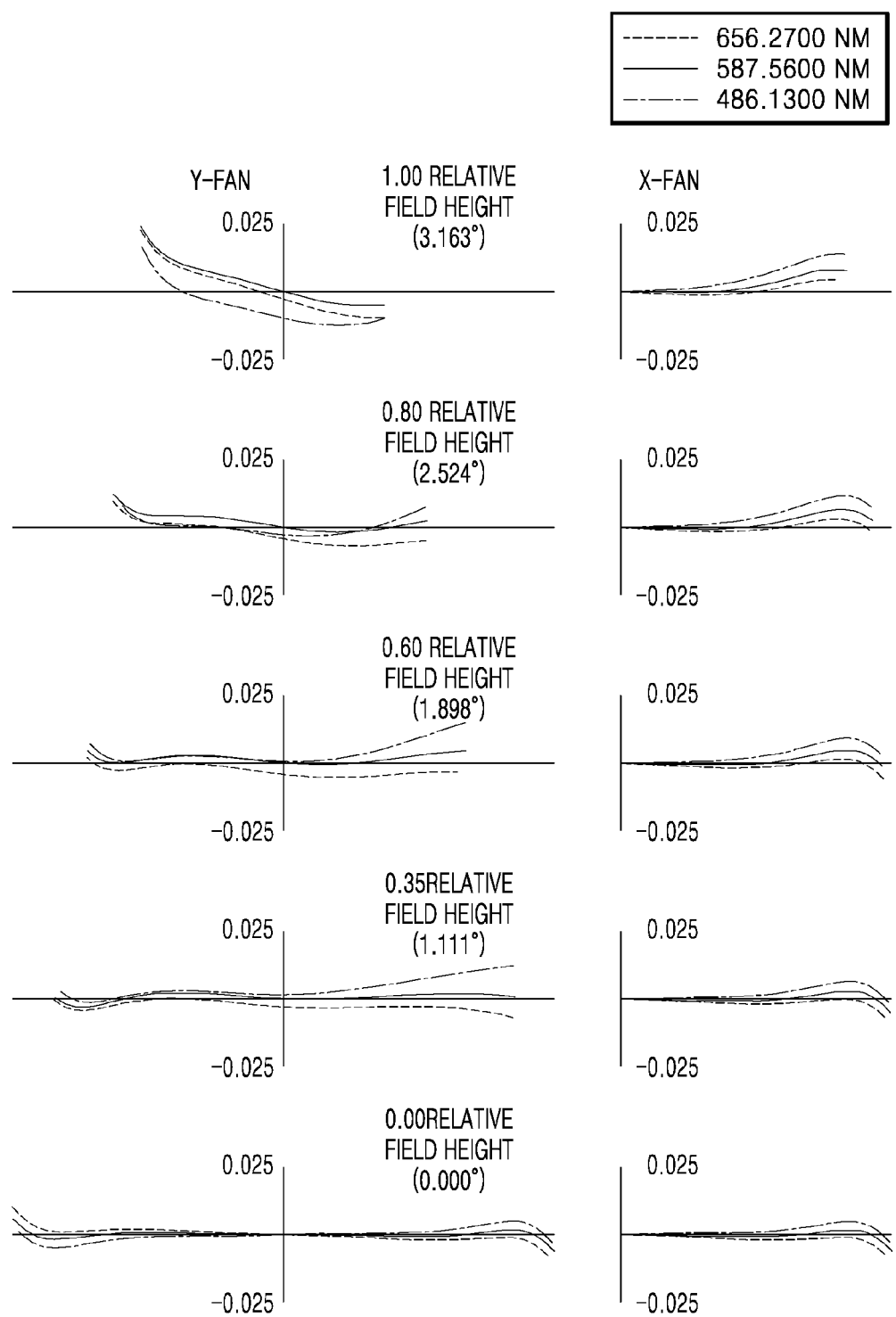
FIG. 4B is a lateral aberration diagram of the telephoto lens system of FIG. 3 when the hand shake correction group of the telephoto lens system is positioned on the optical axis.
Figure 4C:
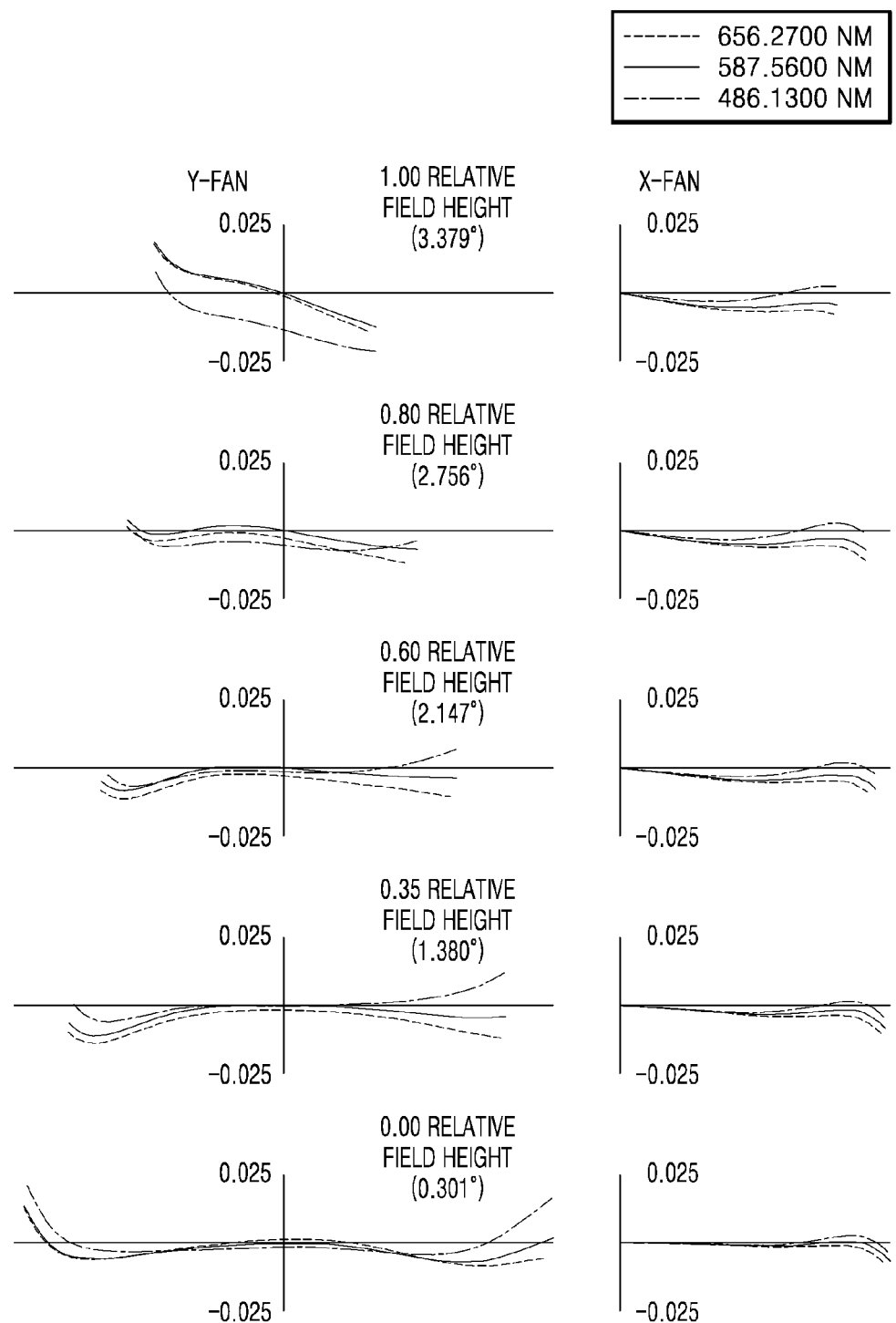
FIG. 4C is a lateral aberration diagram of the telephoto lens system of FIG. 3 when the hand shake correction group of the telephoto lens system is moved upward in a direction perpendicular to the optical axis by 1.3 mm.

FIGS. 4A, 4B, and 4C are lateral aberration diagrams of the telephoto lens system 100-2 when the (3-2)-th lens group G3-2 (the hand shake correction group) of the telephoto lens system 100-2 is moved downward in a direction perpendicular to the optical axis by 1.3 mm, when the (3-2)-th lens group G3-2 (the hand shake correction group) of the telephoto lens system 100-2 is positioned on the optical axis, and when the (3-2)-th lens group G3-2 (the hand shake correction group) of the telephoto lens system 100-2 is moved upward in a direction perpendicular to the optical axis by 1.3 mm, respectively.

Third Embodiment

Figure 5:
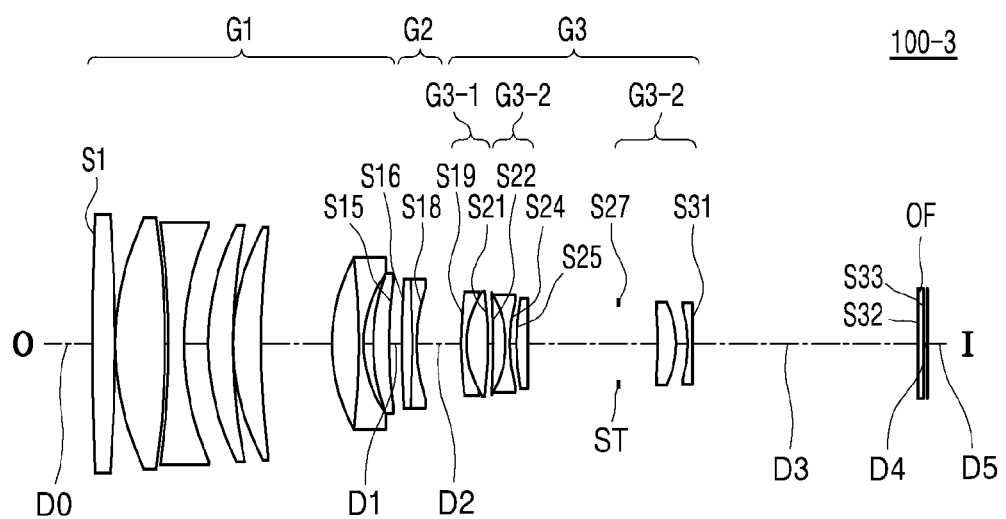
FIG. 5 illustrates a telephoto lens system, according to another embodiment.
Figure 5:
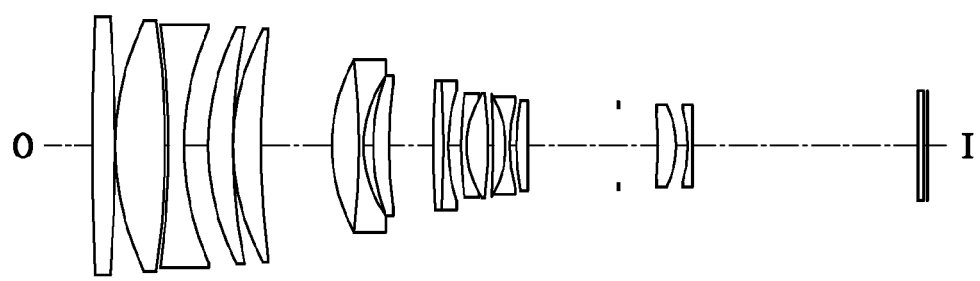

FIG. 5 illustrates a telephoto lens system 100-3 in relation to infinity and a near object distance according to a third embodiment, and the following Table 5 shows design data of the third embodiment.

TABLE 5

| Lens surface | R | Dn | Nd | vd | Z-value | Note |
|---|---|---|---|---|---|---|
| obj | infinity | D0 | | | | |
| S1 | 700.000 | 9.000 | 1.48749 | 70.44 | 0.0711 | First lens group G1 |
| S2 | −700.000 | 0.150 | | | | |
| S3 | 112.044 | 19.500 | 1.49700 | 81.61 | 0.3007 | |
| S4 | −290.788 | 1.300 | | | | |
| S5 | −303.799 | 5.000 | 1.77250 | 49.62 | 0.2821 | |
| S6 | 109.954 | 9.559 | | | | |
| S7 | 100.260 | 10.000 | 1.49700 | 81.61 | 0.1479 | |
| S8 | 280.936 | 0.100 | | | | |
| S9 | 97.857 | 10.000 | 1.84666 | 23.78 | 0.1643 | |
| S10 | 336.176 | 27.661 | | | | |
| S11 | 68.960 | 10.480 | 1.56883 | 56.04 | 0.2684 | |
| S12 | −405.456 | 2.000 | 1.84666 | 23.78 | 0.3125 | |
| S13 | 49.495 | 3.575 | | | | |
| S14 | 83.128 | 6.000 | 1.88300 | 40.80 | 0.1059 | |
| S15 | 230.897 | D1 | | | | |
| S16 | 333.795 | 4.300 | 1.84666 | 23.78 | 0.0623 | Second lens group G2 |
| S17 | −428.496 | 1.210 | 1.74950 | 35.04 | 0.1936 | (AF group) |
| S18 | 65.262 | D2 | | | | |
| S19 | 150.986 | 2.000 | 1.84666 | 23.78 | 0.1723 | (3-1)-th lens group G3-1 |
| S20 | 39.812 | 7.950 | 1.58144 | 40.89 | 0.3167 | |
| S21 | −118.396 | 2.116 | | | | |
| S22 | −274.443 | 5.000 | 1.84666 | 23.78 | 0.2101 | (3-2)-th lens group G3-1 |
| S23 | −38.590 | 1.000 | 1.80610 | 33.27 | 0.3793 | |
| S24 | 67.090 | 3.104 | | | | |
| S25 | 104.599 | 4.000 | 1.84666 | 23.78 | 0.0833 | (3-3)-th lens group G3-3 |
| S26 | infinity | 35.000 | | | | |
| S27(ST) | infinity | 15.328 | | | | |
| S28 | −134.847 | 6.440 | 1.68893 | 31.16 | 0.1010 | |
| S29 | −50.122 | 4.933 | | | | |
| S30 | −60.371 | 1.500 | 1.48749 | 70.44 | 0.1174 | |
| S31 | −700.000 | D3 | | | | |
| S32 | infinity | 2.000 | 1.51680 | 64.20 | | |
| S33 | infinity | D4 | | | | |
| img | infinity | D5 | | | | |

The following Table 6 shows a variable length represented by D0-D5, a focal length f, a viewing angle 2ω, and an F number Fno when focusing is performed in the third embodiment.

TABLE 6

| Item | Infinity | Near Object distance |
|---|---|---|
| D0 | infinity | 2479.999985 |
| D1 | 4.508137 | 16.545915 |
| D2 | 17.785584 | 5.747806 |
| D3 | 86.500310 | 86.500310 |
| D4 | 1.015123 | 1.065022 |
| D5 | −0.015123 | −0.065037 |
| f | 392.114972 | 0.161015 |
| 2ω | 3.159 | 2.167 |
| Fno | 4.052 | 4.052 |

Figure 6A:
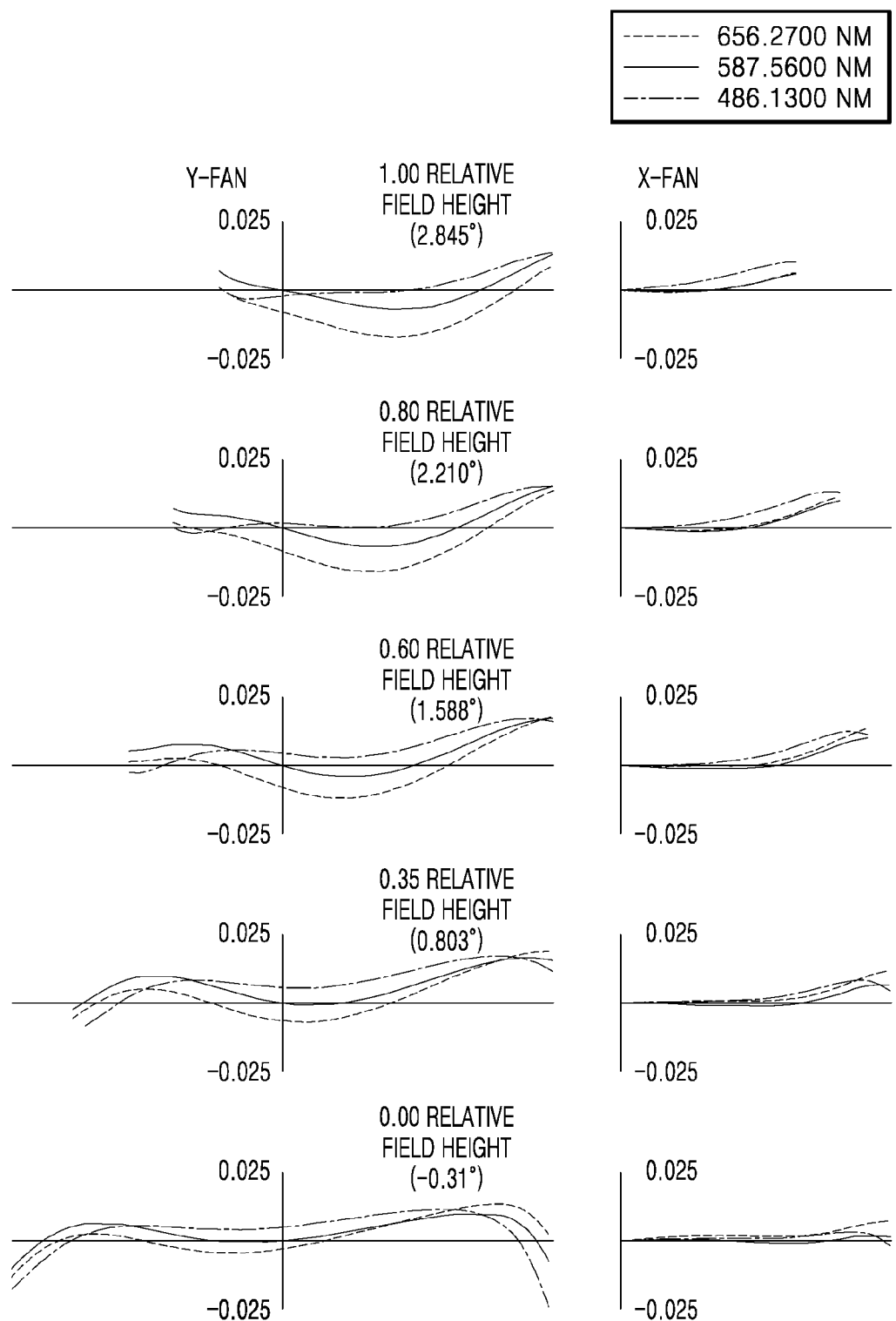
FIG. 6A is a lateral aberration diagram of the telephoto lens system of FIG. 5 when a hand shake correction group of the telephoto lens system is moved downward in a direction perpendicular to an optical axis by 1.05 mm.
Figure 6B:
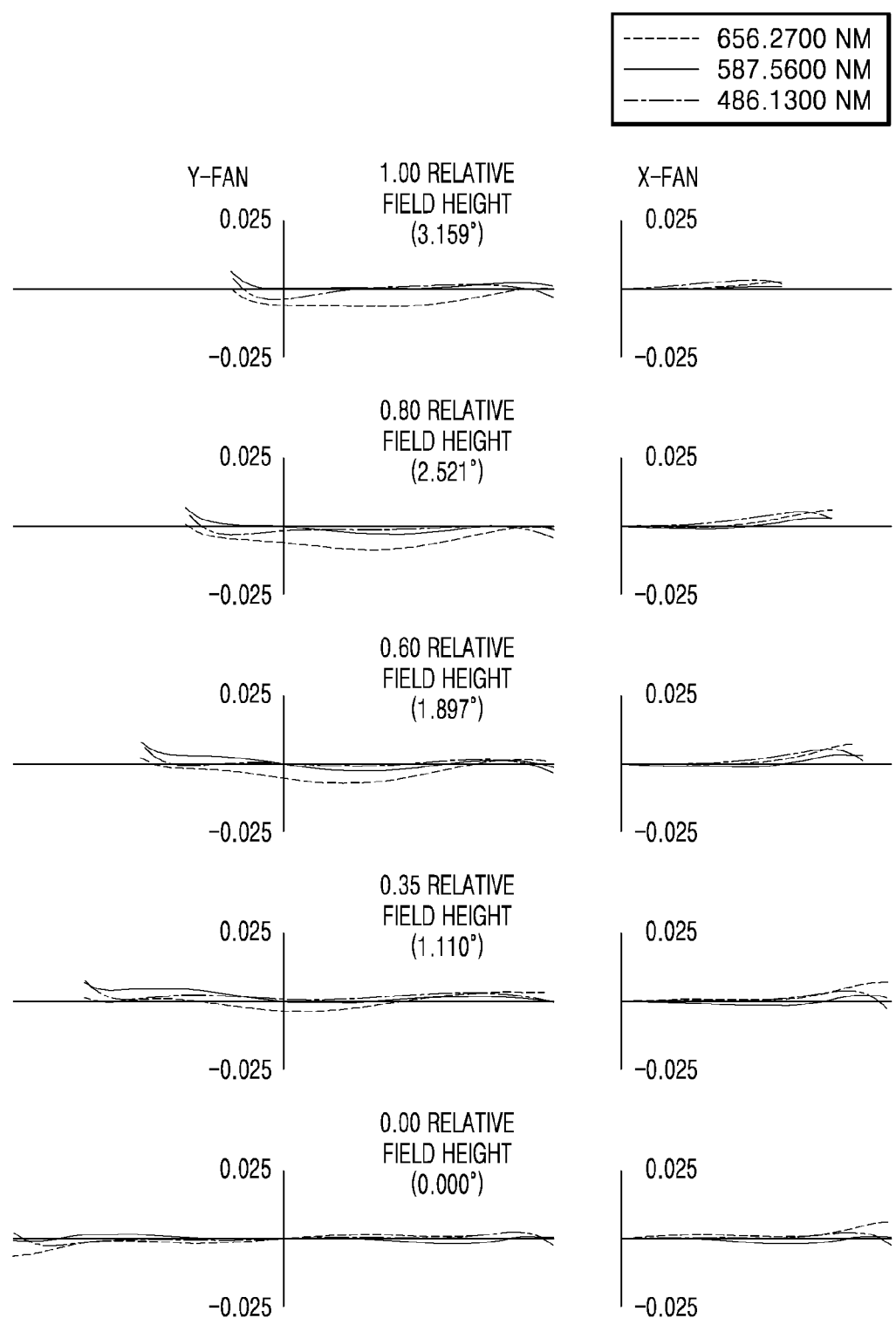
FIG. 6B is a lateral aberration diagram of the telephoto lens system of FIG. 5 when the hand shake correction group of the telephoto lens system is positioned on the optical axis.
Figure 6C:
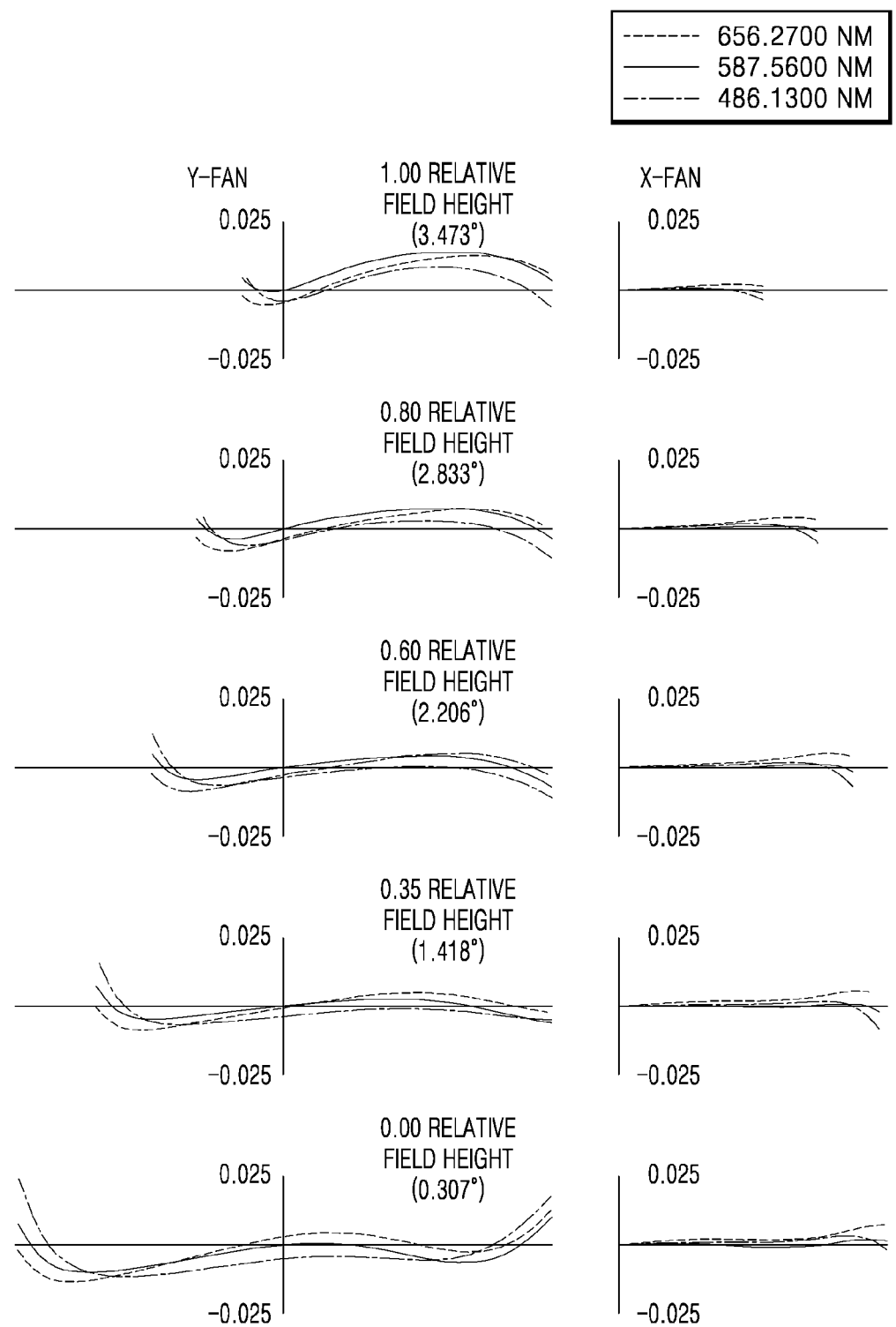
FIG. 6C is a lateral aberration diagram of the telephoto lens system of FIG. 5 when the hand shake correction group of the telephoto lens system is moved upward in a direction perpendicular to the optical axis by 1.05 mm.

FIGS. 6A, 6B, and 6C are lateral aberration diagrams of the telephoto lens system 100-3 when the (3-2)-th lens group G3-2 (the hand shake correction group) of the telephoto lens system 100-3 is moved downward in a direction perpendicular to the optical axis by 1.05 mm, when the (3-2)-th lens group G3-2 (the hand shake correction group) of the telephoto lens system 100-3 is positioned on the optical axis, and when the (3-2)-th lens group G3-2 (the hand shake correction group) of the telephoto lens system 100-3 ais moved upward in a direction perpendicular to the optical axis by 1.05 mm, respectively.

Fourth Embodiment

Figure 7:
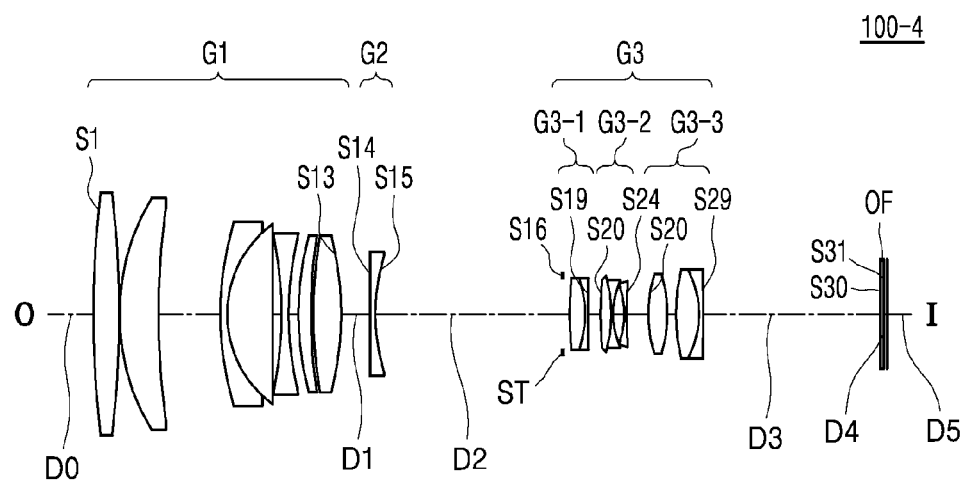
FIG. 7 illustrates a telephoto lens system, according to another embodiment.
Figure 7:
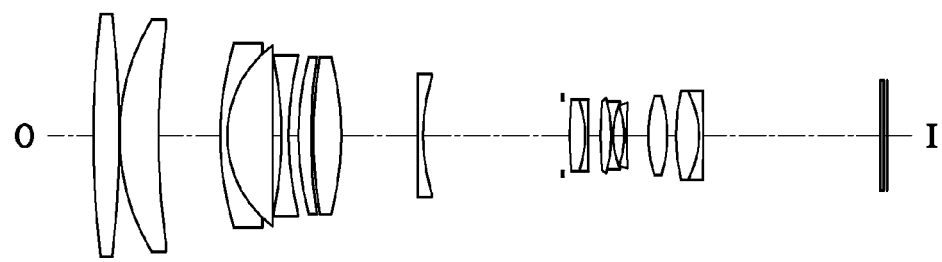

FIG. 7 illustrates a telephoto lens system 100-4 in relation to infinity and a near object distance according to a fourth embodiment, and the following Table 7 shows design data of the fourth embodiment.

TABLE 7

| Lens surface | R | Dn | Nd | Vd | Z-value | Note |
|---|---|---|---|---|---|---|
| obj | infinity | D0 | | | | |
| S1 | 460.000 | 10.000 | 1.48749 | 70.44 | 0.1060 | First lens group G1 |
| S2 | −460.000 | 0.200 | | | | |
| S3 | 91.112 | 16.000 | 1.49700 | 81.61 | 0.2019 | |
| S4 | 400.000 | 24.205 | | | | |
| S5 | 125.561 | 2.540 | 1.69680 | 55.46 | 0.2182 | |
| S6 | 45.800 | 19.000 | 1.49700 | 81.61 | 0.3663 | |
| S7 | infinity | 3.100 | | | | |
| S8 | −181.352 | 3.000 | 1.83481 | 42.72 | 0.2098 | |
| S9 | 131.177 | 3.856 | | | | |
| S10 | 121.917 | 5.000 | 1.72825 | 28.32 | 0.0435 | |
| S11 | 181.352 | 1.000 | | | | |
| S12 | 181.352 | 11.000 | 1.49700 | 81.61 | 0.2041 | |
| S13 | −131.177 | D1 | | | | |
| S14 | infinity | 2.400 | 1.48749 | 70.44 | 0.1321 | Second lens group G2 |
| S15 | 91.112 | D2 | | | | (AF group) |
| S16(ST) | infinity | 3.000 | | | | (3-1)-th lens group G3-1 |
| S17 | 121.917 | 6.000 | 1.72342 | 37.99 | 0.1876 | |
| S18 | −52.370 | 1.500 | 1.76182 | 26.61 | 0.1209 | |
| S19 | −692.229 | 4.780 | | | | |
| S20 | 125.561 | 4.000 | 1.84666 | 23.78 | 0.1552 | (3-2)-th lens group G3-2 |
| S21 | −66.522 | 1.000 | 1.69680 | 55.46 | 0.3057 | |
| S22 | 31.206 | 4.500 | | | | |
| S23 | −52.370 | 1.000 | 1.69680 | 55.46 | 0.1544 | |
| S24 | 205.584 | 8.793 | | | | |
| S25 | 66.522 | 7.000 | 1.54814 | 45.82 | 0.2402 | (3-3)-th lens group G3-3 |
| S26 | −66.522 | 3.809 | | | | |
| S27 | 96.042 | 9.500 | 1.58144 | 40.89 | 0.2908 | |
| S28 | −41.103 | 1.500 | 1.84666 | 23.78 | 0.1822 | |
| S29 | −400.000 | D3 | | | | |
| S30 | infinity | 2.000 | 1.51680 | 64.20 | | |
| S31 | infinity | D4 | | | | |
| img | infinity | D5 | | | | |

The following Table 8 shows a variable length represented by D0-D5, a focal length f, a viewing angle 2ω, and an F number Fno when focusing is performed in the fourth embodiment.

TABLE 8

| Item | Infinity | Near Object distance |
|---|---|---|
| D0 | infinity | 2482.499985 |
| D1 | 11.680434 | 30.830599 |
| D2 | 74.620935 | 55.470771 |
| D3 | 70.516000 | 70.516000 |
| D4 | 0.973641 | 0.998490 |
| D5 | 0.032989 | 0.008868 |
| f | 392.074543 | 0.160535 |
| 2ω | 3.159 | 2.200 |
| Fno | 4.023 | 4.096 |

Figure 8A:
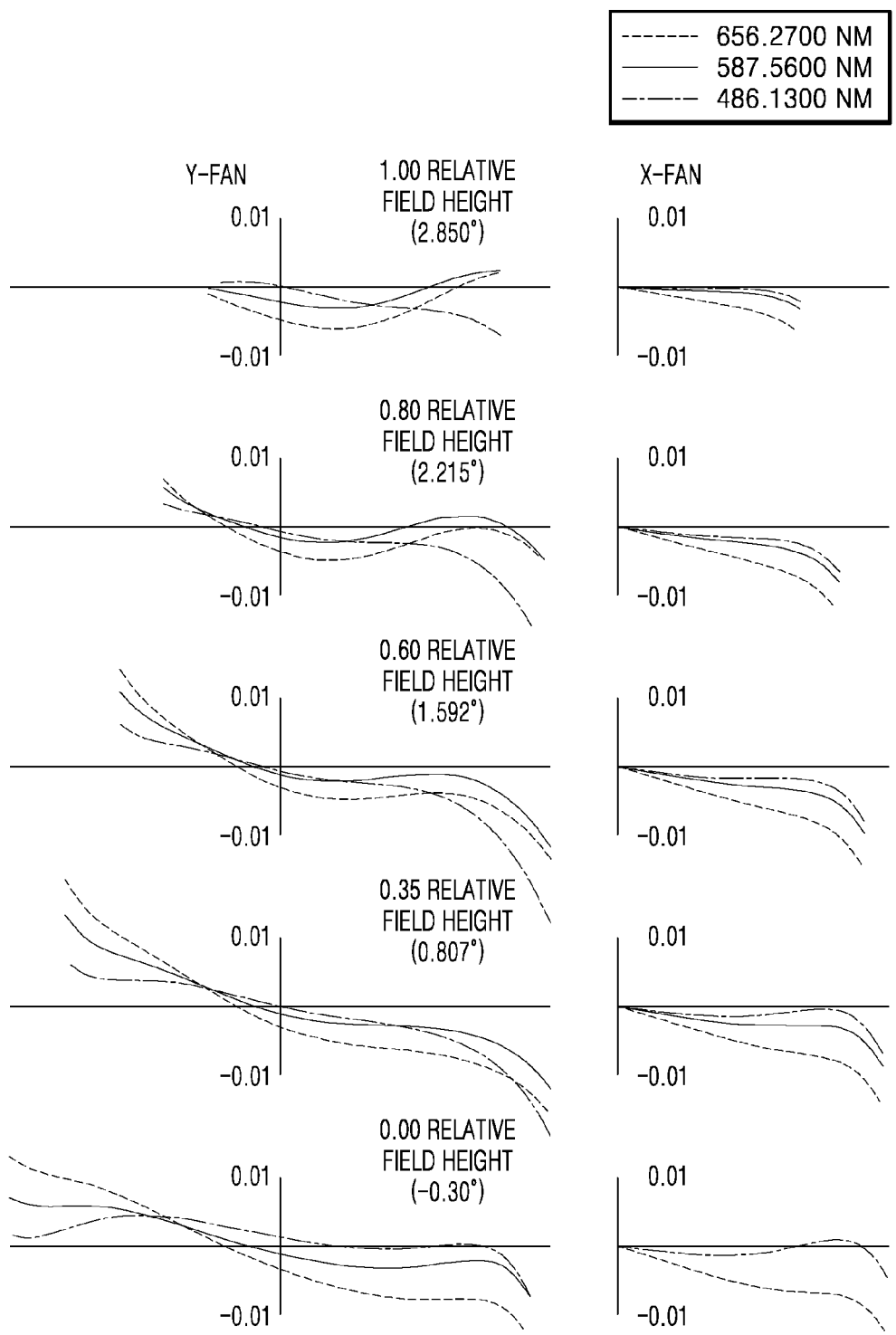
FIG. 8A is a lateral aberration diagram of the telephoto lens system of FIG. 7 when a hand shake correction group of the telephoto lens system is moved downward in a direction perpendicular to an optical axis by 0.86 mm.
Figure 8B:
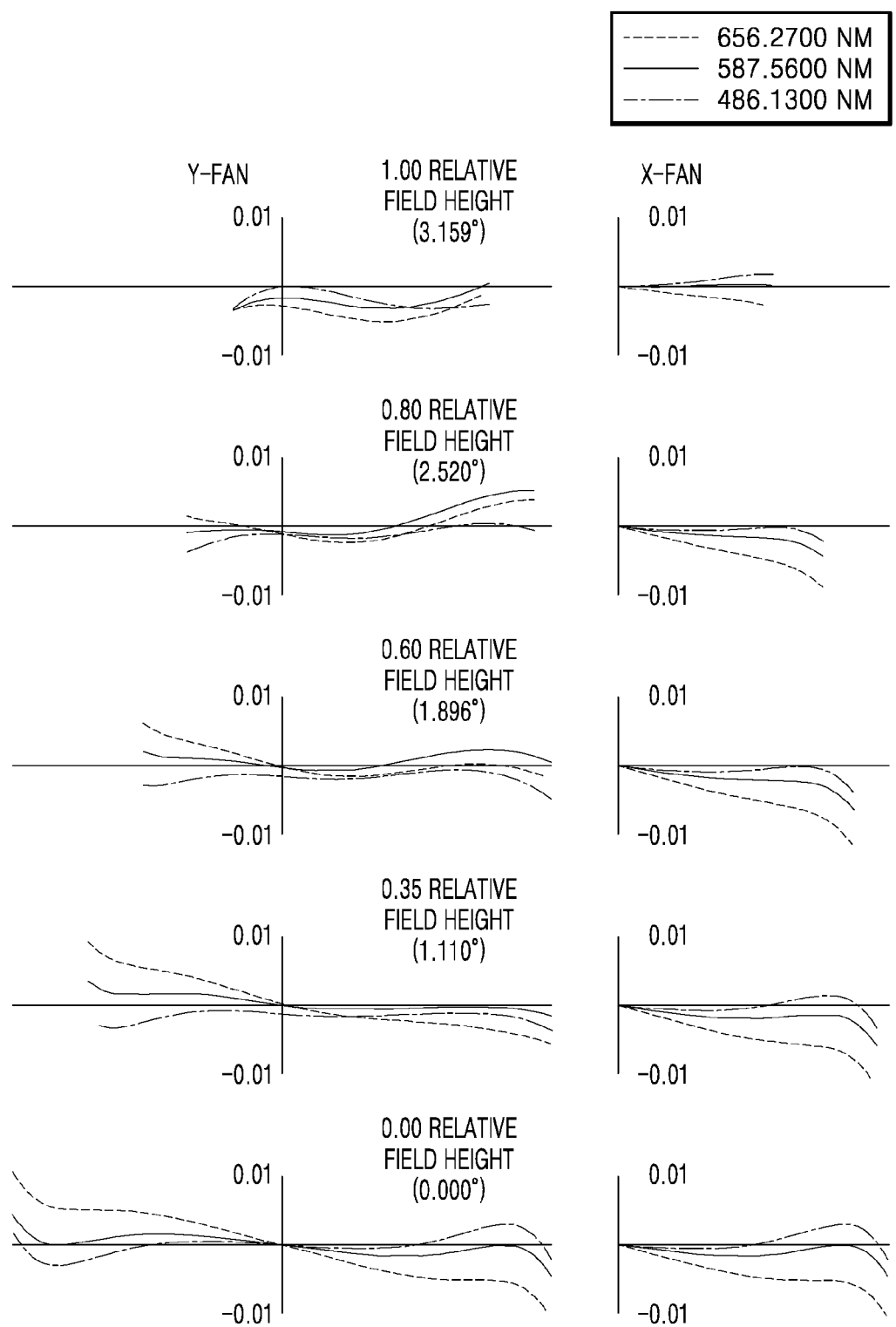
FIG. 8B is a lateral aberration diagram of the telephoto lens system of FIG. 7 when the hand shake correction group of the telephoto lens system is positioned on the optical axis.
Figure 8C:
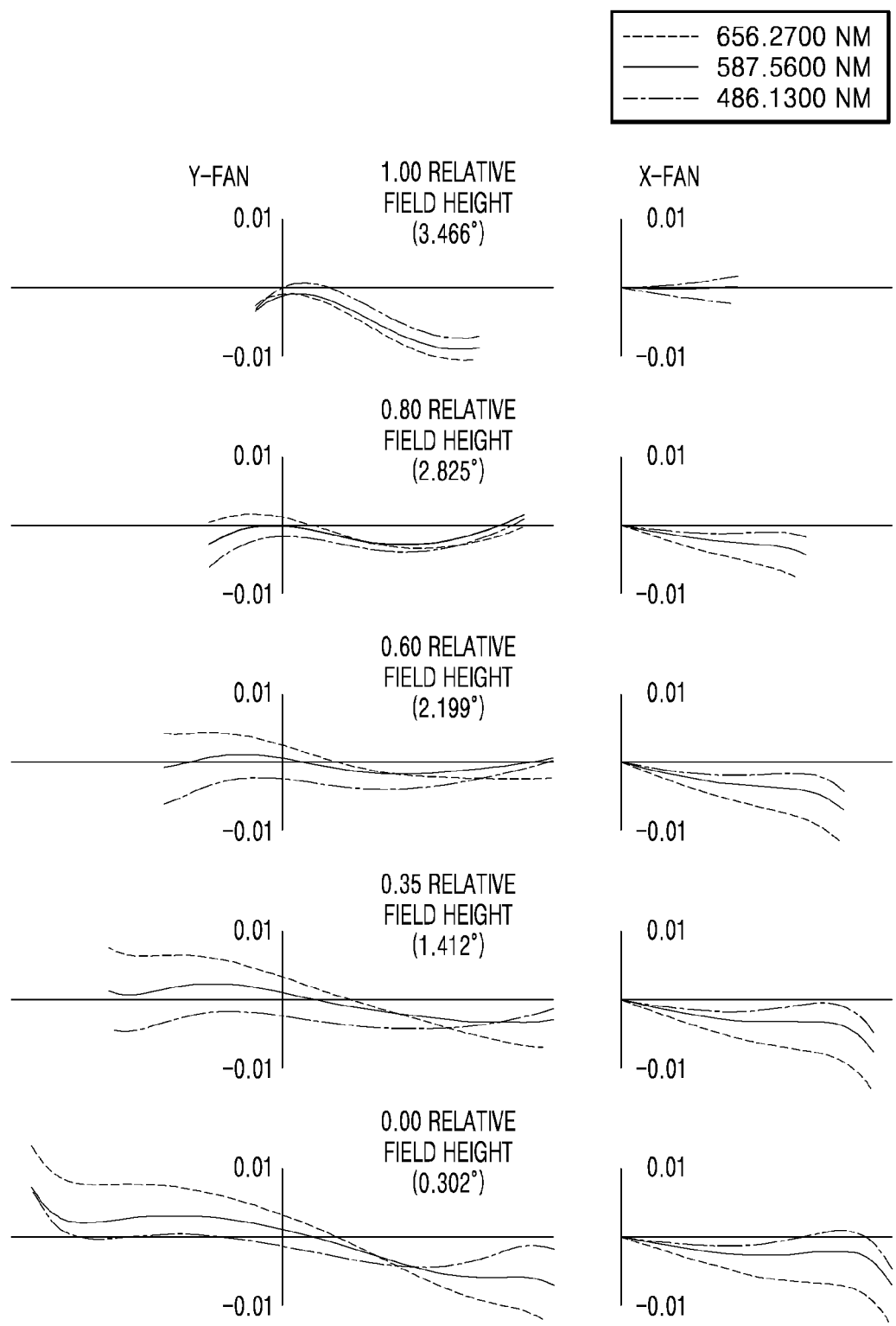
FIG. 8C is a lateral aberration diagram of the telephoto lens system of FIG. 7 when the hand shake correction group of the telephoto lens system is moved upward in a direction perpendicular to the optical axis by 0.86 mm.

FIGS. 8A, 8B, and 8C are lateral aberration diagrams of the telephoto lens system 100-4 when the (3-2)-th lens group G3-2 (the hand shake correction group) of the telephoto lens system 100-4 is moved downward in a direction perpendicular to the optical axis by 0.86 mm, when the (3-2)-th lens group G3-2 (the hand shake correction group) of the telephoto lens system 100-4 is positioned on the optical axis, and when the (3-2)-th lens group G3-2 (the hand shake correction group) of the telephoto lens system 100-4 is moved upward in a direction perpendicular to the optical axis by 0.86 mm, respectively.

The following Table 9 shows that the telephoto lens systems 100-1, 100-2, 100-3, and 100-4 according to the first through fourth embodiments satisfy Equations 1, 2, 3, 4, 5, and 6. For Equation 1, only a lens that is closest to the object side O of the first lens group G1 and a lens that is closest to the image side I of the first lens group G1 are shown.

TABLE 9

| | First embodiment | | Second embodiment | | Third embodiment | | Fourth embodiment | |
|---|---|---|---|---|---|---|---|---|
| Equation 1 | 0.105 | 0.204 | 0.109 | 0.211 | 0.071 | 0.106 | 0.106 | 0.132 |
| Equation 2 | −29.942 | | 34.853 | | −8.523 | | −80.155 | |
| Equations 3, 4 | 0.889 | | 0.838 | | 0.920 | | 0.863 | |
| Equation 5 | −1.895 | | −1.798 | | −1.230 | | −2.148 | |
| Equation 6 | −3.559 | | −3.862 | | −3.259 | | −4.160 | |

Figure 9:
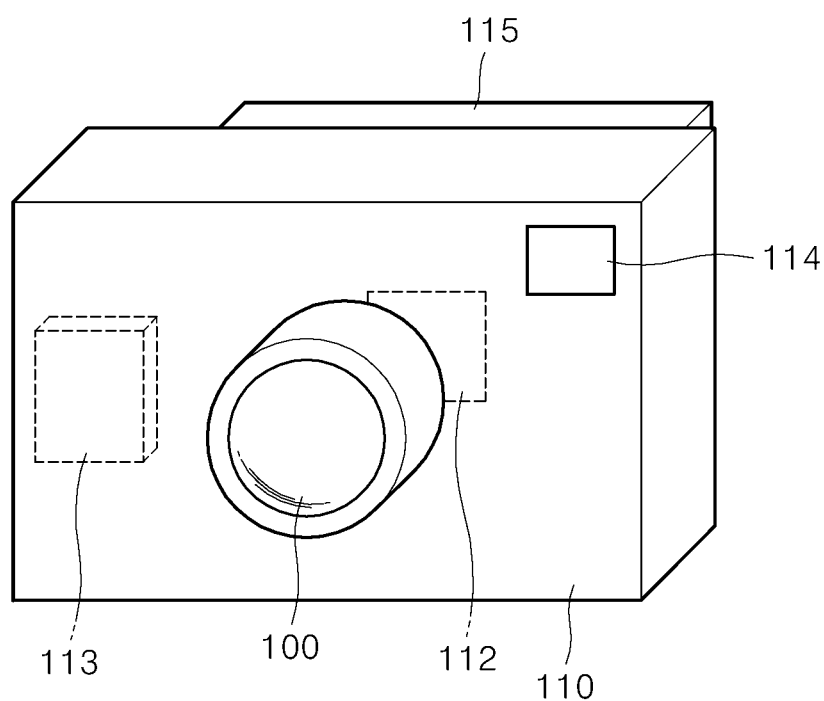
FIG. 9 illustrates an electronic apparatus, according to an embodiment.

FIG. 9 illustrates an electronic apparatus 110 including a telephoto lens system 100, according to an exemplary embodiment. The telephoto lens system 100 may include the telephoto lens systems 100-1, 100-2, 100-3, and 100-4 described above. The electronic apparatus 110 includes an imaging device 112 that receives light formed by the telephoto lens system 100. The electronic apparatus 110 may include a storage unit 113 on which information corresponding to a subject image that is photoelectrically converted from the imaging device 112 is recorded, and a view finder 114 used for observing the subject image. Also, a display unit 115 on which the subject image is displayed may be provided. Here, although the view finder 114 and the display unit 115 are individually provided, the display unit 115 may be provided without the view finder 114. The electronic apparatus illustrated in FIG. 9 is just an example, and aspects of the invention are not limited thereto. Various embodiments may be applied to various optical devices in addition to a camera, for example, a digital still camera, a video camera, an exchangeable lens camera, a mobile phone, or any electronic device having image capturing capabilities. In this way, by applying the telephoto lens system according to the exemplary embodiments to an electronic apparatus, such as a digital camera, an optical device that is capable of performing fast auto focusing can be implemented.

As described above, according to the one or more of the above embodiments, the telephoto lens system may adopt an inner focusing method so that the telephoto lens system can be miniaturized. Instead of using a front focusing method, whereby a lens that is closest to the object side of the telephoto lens system is moved to perform focusing, the inner focusing method is used in the present embodiments, whereby lenses inside the telephoto lens system are moved to perform focusing, so that the telephoto lens system can be conveniently carried in a portable form. In addition, the telephoto lens system has a long focal length and may be affected by hand shake as a viewing angle decreases. By providing a hand shake correction group, degradation of performance caused by hand shake can be prevented.

It should be understood that the exemplary embodiments described therein should be considered in a descriptive sense only and not for purposes of limitation. Descriptions of features or aspects within each embodiment should typically be considered as available for other similar features or aspects in other embodiments.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention. No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. A telephoto lens system comprising:
a first lens group having a positive refractive power;
a second lens group having a negative refractive power; and
a third lens group comprising a (3-1)-th lens group having a positive refractive power, a (3-2)-th lens group having a negative refractive power, and a (3-3)-th lens group having a positive refractive power,
wherein all lenses included in the first lens group satisfy the following equation 1, and the third lens group satisfies the following equation 2:

$$\frac{1}{4} \cdot \left\| \frac{D_1}{R_1} \right| - \left| \frac{D_2}{R_2} \right\| \geq 0.06, \quad (1)$$

$$6 \leq \left| f_3 \cdot \left( \frac{1}{f_{3\text{-}1}} + \frac{1}{f_{3\text{-}2}} + \frac{1}{f_{3\text{-}3}} \right) \right|, \quad (2)$$

where for each lens included in the first lens group, $D_1$ is an effective diameter of a lens surface directed toward an object side, $R_1$ is a radius of curvature of the lens surface directed toward the object side, $D_2$ is an effective diameter of a lens surface directed toward an image side, and $R_2$ is a radius of curvature of the lens surface directed toward the image side, and where $f_3$ is a focal length of the third lens group, $f_{3-1}$ is a focal length of the (3-1)-th lens group, $f_{3-2}$ is a focal length of the (3-2)-th lens group, and $f_{3-3}$ is a focal length of the (3-3)-th lens group.

2. The telephoto lens system of claim 1, wherein the second lens group performs focusing.

3. The telephoto lens system of claim 1, wherein the (3-2)-th lens group comprises at least one bi-concave lens.

4. The telephoto lens system of claim 1, wherein the (3-2)-th lens group comprises two or three lenses.

5. The telephoto lens system of claim 1, wherein the (3-2)-th lens group performs hand shake correction.

6. The telephoto lens system of claim 1, wherein the telephoto lens system satisfies the following equation:

$$-2.5 \leq f \cdot \left( \frac{1}{f_1} + \frac{1}{f_2} + \frac{1}{f_{3-1}} + \frac{1}{f_{3-2}} + \frac{1}{f_{3-3}} \right) \leq 2.5,$$

where $f_1$ is a focal length of the first lens group, $f_2$ is a focal length of the second lens group, $f_{3-1}$ is the focal length of the (3-1)-th lens group, $f_{3-2}$ is the focal length of the (3-2)-th lens group, and $f_{3-3}$ is the focal length of the (3-3)-th lens group.

7. The telephoto lens system of claim 1, wherein the telephoto lens system satisfies the following equation:

$$-5 \leq f \cdot \left( \frac{n_1}{f_1} + \frac{n_2}{f_2} + \frac{n_{3-1}}{f_{3-1}} + \frac{n_{3-2}}{f_{3-2}} + \frac{n_{3-3}}{f_{3-3}} \right) \leq 5,$$

where $n_1$ is an average refractive index of the first lens group, $n_2$ is an average refractive index of the second lens group, $n_{3-1}$ is an average refractive index of the (3-1)-th lens group, $n_{3-2}$ is an average refractive index of the (3-2)-th lens group, $n_{3-3}$ is an average refractive index of the (3-3)-th lens group, $f_1$ is a focal length of the first lens group, $f_2$ is a focal length of the second lens group, $f_{3-1}$ is the focal length of the (3-1)-th lens group, $f_{3-2}$ is the focal length of the (3-2)-th lens group, and $f_{3-3}$ is the focal length of the (3-3)-th lens group.

8. The telephoto lens system of claim 1, wherein the third lens group comprises an aperture stop.

9. The telephoto lens system of claim 1, wherein the second lens group comprises at least one concave lens.

10. The telephoto lens system of claim 1, wherein the (3-2)-th lens group comprises at least one doublet lens.

11. The telephoto lens system of claim 1, wherein the second lens group moves toward the image side when focusing is performed.

12. The telephoto lens system of claim 1, wherein the first lens group comprises a lens having an Abbe number of less than 75, the lens being closest to the object side among all the lenses of the first lens group.

13. A telephoto lens system comprising:
a first lens group having a positive refractive power;
a second lens group having a negative refractive power; and
a third lens group comprising a (3-1)-th lens group having a positive refractive power, a (3-2)-th lens group having a negative refractive power, and a (3-3)-th lens group having a positive refractive power,
wherein all lenses included in the first lens group satisfy the following equation 3, and the first lens group and the second lens group satisfy the following equation 4:

$$\frac{1}{4} \cdot \left\| \frac{D_1}{R_1} \right| - \left| \frac{D_2}{R_2} \right\| \geq 0.06, \quad (3)$$

$$0.7 \leq \frac{f_{12}}{f} \leq 1.2, \quad (4)$$

where for each lens included in the first lens group, $D_1$ is an effective diameter of a lens surface directed toward an object side, $R_1$ is a radius of curvature of the lens surface directed toward the object side, $D_2$ is an effective diameter of a lens surface directed toward an image side, and $R_2$ is a radius of curvature of the lens surface directed toward the image side, and where $f_3$ is a focal length of the third lens group, $f_{3-1}$ is a focal length of the (3-1)-th lens group, $f_{3-2}$ is a focal length of the (3-2)-th lens group, and $f_{3-3}$ is a focal length of the (3-3)-th lens group.

14. The telephoto lens system of claim 13, wherein the second lens group performs focusing.

15. The telephoto lens system of claim 13, wherein the (3-2)-th lens group comprises at least one bi-concave lens.

16. The telephoto lens system of claim 13, wherein the (3-2)-th lens group comprises two or three lenses.

17. The telephoto lens system of claim 13, wherein the (3-2)-th lens group performs hand shake correction.

18. The telephoto lens system of claim 13, wherein the telephoto lens system satisfies the following equation:

$$-2.5 \leq f \cdot \left( \frac{1}{f_1} + \frac{1}{f_2} + \frac{1}{f_{3-1}} + \frac{1}{f_{3-2}} + \frac{1}{f_{3-3}} \right) \leq 2.5,$$

where $f_1$ is a focal length of the first lens group, $f_2$ is a focal length of the second lens group, $f_{3-1}$ is a focal length of the (3-1)-th lens group, $f_{3-2}$ is a focal length of the (3-2)-th lens group, and $f_{3-3}$ is a focal length of the (3-3)-th lens group.

19. A telephoto lens system comprising:
a first lens group having a positive refractive power;
a second lens group having a negative refractive power; and
a third lens group comprising a (3-1)-th lens group having a positive refractive power, a (3-2)-th lens group having a negative refractive power, and a (3-3)-th lens group having a positive refractive power,
wherein the telephoto lens system satisfies the following equation:

$$0.7 \leq \frac{f_{12}}{f} \leq 0.95,$$

where $f_{12}$ is an effective focal length of the first lens group and the second lens group from infinity, and f is the entire focal length of the telephoto lens system from infinity.

20. The telephoto lens system of claim 19, wherein the second lens group performs focusing.

21. The telephoto lens system of claim 19, wherein the (3-2)-th lens group comprises at least one bi-concave lens.

22. The telephoto lens system of claim 19, wherein the (3-2)-th lens group performs hand shake correction.

23. The telephoto lens system of claim 19, wherein the telephoto lens system satisfies the following equation:

$$-2.5 \leq f \cdot \left( \frac{1}{f_1} + \frac{1}{f_2} + \frac{1}{f_{3-1}} + \frac{1}{f_{3-2}} + \frac{1}{f_{3-3}} \right) \leq 2.5,$$

where $f_1$ is a focal length of the first lens group, $f_2$ is a focal length of the second lens group, $f_{3-1}$ is a focal length of the (3-1)-th lens group, $f_{3-2}$ is a focal length of the (3-2)-th lens group, and $f_{3-3}$ is a focal length of the (3-3)-th lens group.

24. An electronic apparatus comprising:
    a telephoto lens system; and
    an imaging device that receives light formed by the telephoto lens system,
    wherein the telephoto lens system comprises:
        a first lens group having a positive refractive power;
        a second lens group having a negative refractive power; and
        a third lens group comprising a (3-1)-th lens group having a positive refractive power, a (3-2)-th lens group having a negative refractive power,
    and a (3-3)-th lens group having a positive refractive power,
    wherein all lenses included in the first lens group satisfy the following equation 1, and the third lens group satisfies the following equation 2:

$$\frac{1}{4} \cdot \left\| \left|\frac{D_1}{R_1}\right| - \left|\frac{D_2}{R_2}\right| \right\| \geq 0.06, \quad (1)$$

$$6 \leq \left| f_3 \cdot \left( \frac{1}{f_{3-1}} + \frac{1}{f_{3-2}} + \frac{1}{f_{3-3}} \right) \right|, \quad (2)$$

where for each lens included in the first lens group, $D_1$ is an effective diameter of a lens surface directed toward an object side, $R_1$ is a radius of curvature of the lens surface directed toward the object side, $D_2$ is an effective diameter of a lens surface directed toward an image side, and $R_2$ is a radius of curvature of the lens surface directed toward the image side, and where $f_3$ is a focal length of the third lens group, $f_{3-1}$ is a focal length of the (3-1)-th lens group, $f_{3-2}$ is a focal length of the (3-2)-th lens group, and $f_{3-3}$ is a focal length of the (3-3)-th lens group.

25. The photographing apparatus of claim 24, wherein the second lens group performs focusing.

* * * * *